US012076991B2

(12) United States Patent
Naganuma et al.

(10) Patent No.: US 12,076,991 B2
(45) Date of Patent: Sep. 3, 2024

(54) LIQUID EJECTING HEAD AND LIQUID EJECTING APPARATUS

(71) Applicant: SEIKO EPSON CORPORATION, Tokyo (JP)

(72) Inventors: Yoichi Naganuma, Matsumoto (JP); Yuma Fukuzawa, Matsumoto (JP); Shohei Mizuta, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 195 days.

(21) Appl. No.: 17/880,708

(22) Filed: Aug. 4, 2022

(65) Prior Publication Data

US 2023/0043344 A1 Feb. 9, 2023

(30) Foreign Application Priority Data

Aug. 5, 2021 (JP) ................................ 2021-128842

(51) Int. Cl.
*B41J 2/14* (2006.01)

(52) U.S. Cl.
CPC .. *B41J 2/14233* (2013.01); *B41J 2002/14419* (2013.01); *B41J 2202/11* (2013.01); *B41J 2202/12* (2013.01)

(58) Field of Classification Search
CPC .......... B41J 2/14233; B41J 2002/14419; B41J 2202/11
See application file for complete search history.

(56) References Cited

U.S. PATENT DOCUMENTS 6,979,077 B2 * 12/2005 Sakaida ............... B41J 2/14209 347/68
2013/0233939 A1 9/2013 Uezawa
2014/0078224 A1 3/2014 Park et al.
2020/0223227 A1 7/2020 Sugiura

FOREIGN PATENT DOCUMENTS

JP 2013-184372 A 9/2013

* cited by examiner

*Primary Examiner* — Geoffrey S Mruk
(74) *Attorney, Agent, or Firm* — Harness, Dickey & Pierce, P.L.C.

(57) ABSTRACT

A liquid ejecting head includes a first pressure compartment extending in a first direction; a second pressure compartment extending in the first direction; a first communication passage continuous from the first pressure compartment and extending in the first direction; a second communication passage continuous to the second pressure compartment and extending in the first direction; a third communication passage continuous from the first communication passage and extending in a second direction intersecting with the first direction; a fourth communication passage continuous to the second communication passage and extending in the second direction; a fifth communication passage continuous from the third communication passage and continuous to the fourth communication passage and extending in the first direction; and a nozzle provided on the fifth communication passage.

20 Claims, 8 Drawing Sheets

LIQUID EJECTING HEAD AND LIQUID EJECTING APPARATUS

The present application is based on, and claims priority from JP Application Serial Number 2021-128842, filed Aug. 5, 2021, the disclosure of which is hereby incorporated by reference herein in its entirety.

BACKGROUND

1. Technical Field

The present disclosure relates to a liquid ejecting head and a liquid ejecting apparatus.

2. Related Art

A liquid ejecting head that includes pressure compartments, piezoelectric elements configured to apply pressure to liquid in the pressure compartments, and flow passages for communication between the pressure compartments and nozzles is known as disclosed in, for example, JP-A-2013-184372.

If, for example, obstruction to or stagnation in liquid flow occurs due to liquid collision inside a flow passage that is in communication with pressure compartments and a nozzle, there is a possibility that sufficient performance of ejecting the liquid from the nozzle cannot be obtained.

SUMMARY

The present disclosure can be embodied in the following aspects, though not limited thereto.

(1) In a first aspect of the present disclosure, a liquid ejecting head is provided. The liquid ejecting head of this aspect includes: a first pressure compartment extending in a first direction; a second pressure compartment extending in the first direction; a first communication passage continuous from the first pressure compartment and extending in the first direction; a second communication passage continuous to the second pressure compartment and extending in the first direction; a third communication passage continuous from the first communication passage and extending in a second direction intersecting with the first direction; a fourth communication passage continuous to the second communication passage and extending in the second direction; a fifth communication passage continuous from the third communication passage and continuous to the fourth communication passage and extending in the first direction; and a nozzle provided on the fifth communication passage.

(2) In a second aspect of the present disclosure, a liquid ejecting apparatus is provided. The liquid ejecting apparatus of this aspect includes: the liquid ejecting head according to the above first aspect; and a control device that controls operation of ejecting liquid from the liquid ejecting head according to the above first aspect.

DESCRIPTION OF EXEMPLARY EMBODIMENTS

A. First Embodiment

Figure 1:
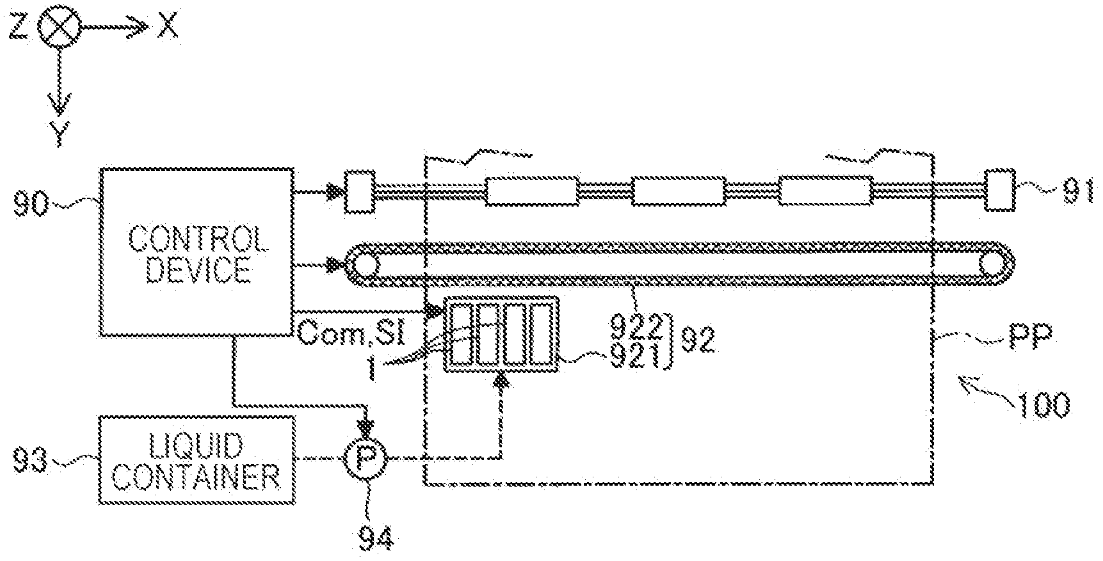
FIG. 1 is a diagram for explaining an example of a liquid ejecting apparatus according to a first embodiment.

FIG. 1 is a diagram for explaining an example of a liquid ejecting apparatus 100 according to a first embodiment. The liquid ejecting apparatus 100 according to the first embodiment is an ink-jet printing apparatus that ejects ink, which is an example of liquid, onto a medium PP such as printing paper. Besides printing paper, any print target medium such as a resin film or a cloth may be used as the medium PP. In FIG. 1 and the subsequent figures, X, Y, and Z represent three spatial axes orthogonal to one another. In this specification, directions along these axes will be referred to also as “X-axis direction”, “Y-axis direction”, and “Z-axis direction”. The X-axis direction is an example of a first direction. The Z-axis direction is an example of a second direction. When there is a need to specify its specific orientation, a plus or minus sign, “+” for a positive direction and “−” for a negative direction, will be used in combination with such axial denotation of direction. The direction indicated by an arrowhead in each figure will be described as a positive direction (+). The opposite direction will be described as a negative direction (−). In the present embodiment, a case where the Z direction is the vertical direction will be disclosed as an example. In the disclosed example, the +Z direction is the vertically-downward direction, and the −Z direction is the vertically-upward direction. Three symbols X, Y, and Z will be used for denotation of X, Y, and Z axes when their positive/negative directional polarities are not limited. The first direction and the second direction do not necessarily have to be orthogonal to each other. The first direction and the second direction may intersect with each other at any interior angle.

As illustrated in FIG. 1, the liquid ejecting apparatus 100 includes a plurality of liquid ejecting heads 1 configured to eject liquid, a control device 90, a moving mechanism 91, a carriage mechanism 92, liquid containers 93, and a circulation mechanism 94. The control device 90 is a microcomputer that includes, for example, a microprocessor such as a CPU or an FPGA, and a storage circuit such as a semiconductor memory. The control device 90 controls the operation of each component of the liquid ejecting apparatus 100 by running a program pre-stored in the storage circuit. For example, the control device 90 is able to control the operation of ejecting ink from the liquid ejecting head 1. Specifically, signals for controlling the ejection of ink, etc., are supplied from the control device 90 to the liquid ejecting head 1. In accordance with the signals supplied from the control device 90, the liquid ejecting head 1 ejects, at an instructed timing, an instructed amount of the ink supplied from the liquid container 93.

Ink is contained in the liquid container 93. For example, as the ink, ink having pigments dispersed as a colorant in a dissolvent, ink containing dye, or ink containing both pigments and dye as colorants can be used. The ink may include various kinds of liquid composition such as popular water-based ink, oil-based ink, gel ink, hot melt ink, etc. For example, a cartridge that can be detachably attached to the liquid ejecting apparatus 100, a bag-type ink pack made of a flexible film material, an ink tank that can be refilled with ink, etc. may be used as the liquid container 93.

The circulation mechanism 94 is a pump configured to, under the control of the control device 90, supply the liquid contained in the liquid container 93 to the liquid ejecting head 1. The circulation mechanism 94 collects ink that remains inside the liquid ejecting head 1 and causes the collected ink to flow back to the liquid ejecting head 1.

Under the control of the control device 90, the moving mechanism 91 transports the medium PP in the +Y direction. The carriage mechanism 92 includes a housing case 921, in which the plurality of liquid ejecting heads 1 is housed, and an endless belt 922, to which the housing case 921 is fixed. The carriage mechanism 92 causes the liquid ejecting heads 1 to reciprocate in the X-axis direction by causing the endless belt 922, to which the housing case 921 is fixed, to operate under the control of the control device 90. The transportation direction of the medium PP and the movement direction of the liquid ejecting heads 1 may intersect with each other at a predetermined angle, without being limited to intersection at a right angle. The liquid containers 93 and the circulation mechanism 94 may be housed together with the liquid ejecting heads 1 in the housing case 921.

As illustrated in FIG. 1, the control device 90 outputs a drive signal Com for driving the liquid ejecting head 1 and a control signal SI for controlling the liquid ejecting head 1 to the liquid ejecting head 1. Driven by the drive signal Com under the control by the control signal SI, the liquid ejecting head 1 ejects ink from a part or a whole of a plurality of nozzles provided on the liquid ejecting head 1. In the present embodiment, the direction in which ink is ejected is the +Z direction. The liquid ejecting head 1 ejects ink from its nozzles while being reciprocated by the carriage mechanism 92 in link with the transportation of the medium PP by the moving mechanism 91, thereby causing droplets of the ink to land onto the surface of the medium PP. As a result of this operation, a predetermined image is formed on the surface of the medium PP. The direction in which the ink is ejected is not limited to the +Z direction. The ink may be ejected in any direction intersecting with an X-Y plane.

Figure 2:
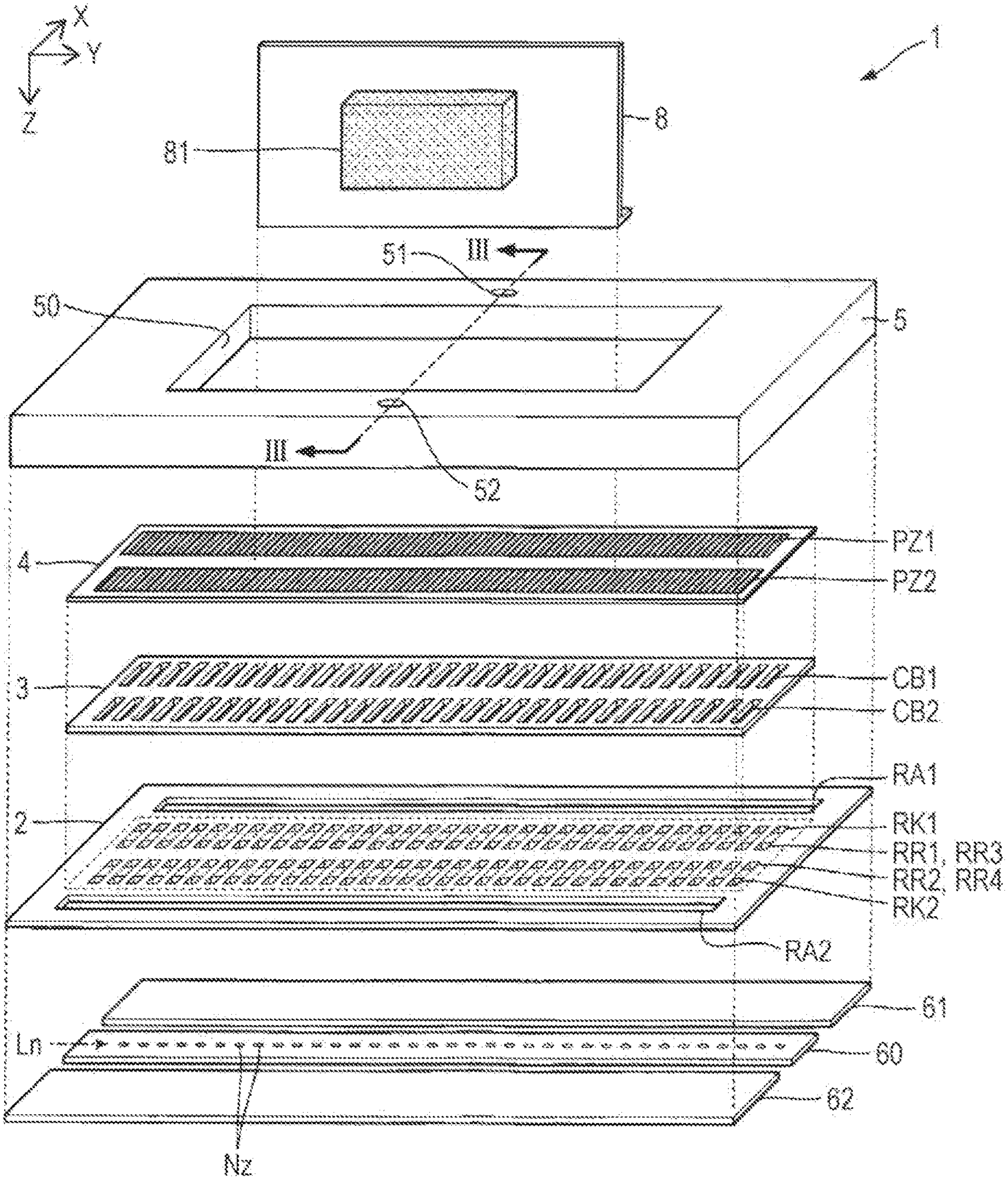
FIG. 2 is an exploded perspective view of a liquid ejecting head.
Figure 3:
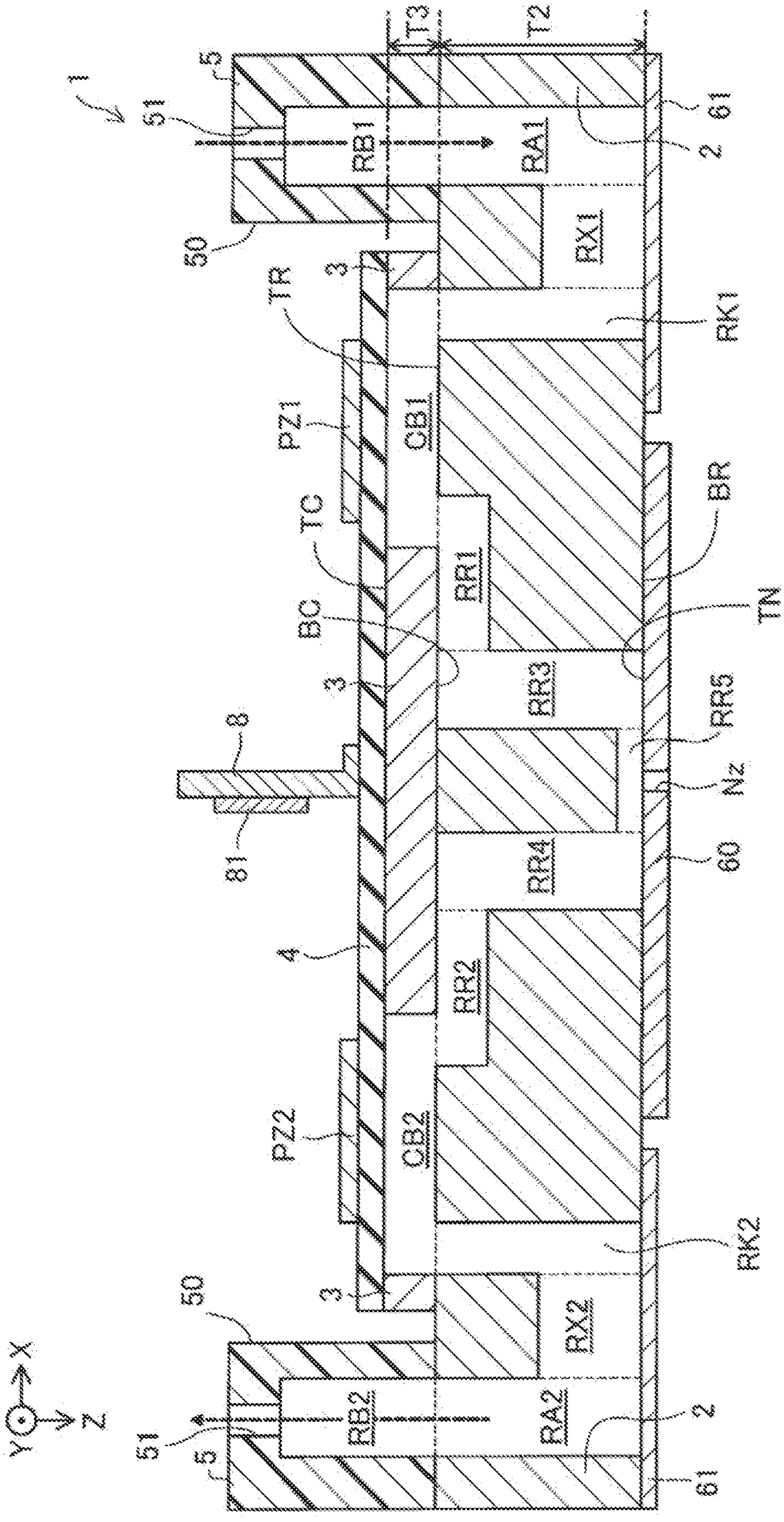
FIG. 3 is a cross-sectional view taken along the line III-III of FIG. 2.
Figure 4:
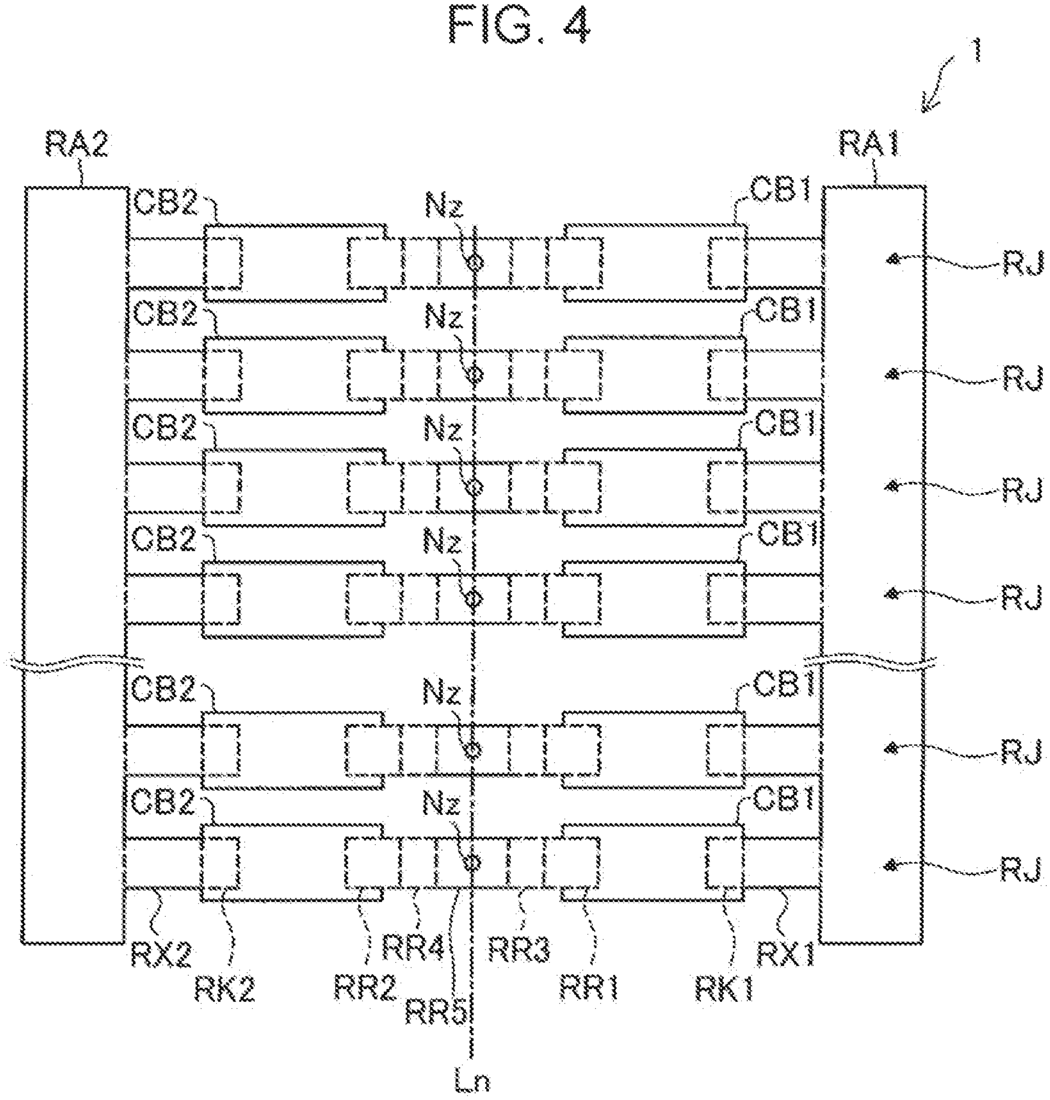
FIG. 4 is a diagram that schematically illustrates the internal ink flow passages of the liquid ejecting head in a plan view.
Figure 5:
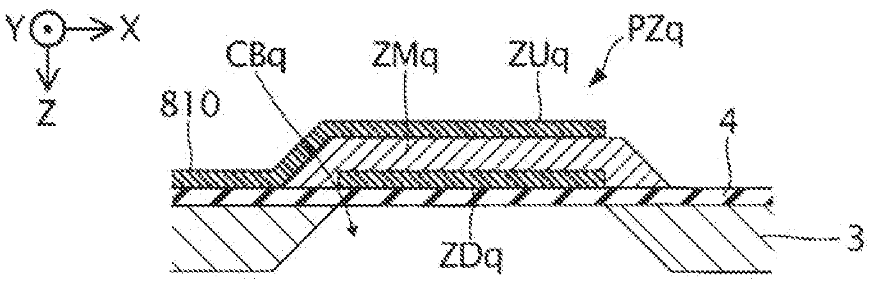
FIG. 5 is an enlarged cross-sectional view of a piezoelectric element, including its neighborhood.

With reference to FIGS. 2 to 5, the structure of the liquid ejecting head 1 will now be explained. FIG. 2 is an exploded perspective view of the liquid ejecting head 1. FIG. 3 is a cross-sectional view taken along the line III-III of FIG. 2. In FIG. 3, in order to facilitate the readers' understanding of the disclosed technique, broken lines are used for schematically illustrating boundaries between flow passages. FIG. 4 is a diagram that schematically illustrates the internal ink flow passages of the liquid ejecting head 1 in a plan view. FIG. 5 is an enlarged cross-sectional view of a piezoelectric element PZq, including its neighborhood. As illustrated in FIG. 2, the liquid ejecting head 1 includes a nozzle substrate 60, a communication plate 2, a pressure compartment substrate 3, a diaphragm 4, a reservoir forming substrate 5, a wiring substrate 8, a compliance sheet 61, and a compliance sheet 62.

As illustrated in FIG. 2, the nozzle substrate 60 is a plate-like member that is elongated in the Y-axis direction. The nozzle substrate 60 is manufactured by, for example, processing a monocrystalline silicon substrate by using a semiconductor manufacturing technology such as etching. The nozzle substrate 60 has M-number of nozzles Nz. The value M is a natural number that is not less than one. The nozzle Nz is a through hole provided in the nozzle substrate 60. In the present embodiment, the nozzles Nz, the number of which is M, are arranged linearly in the nozzle substrate 60 in such a way as to form a nozzle row Ln extending in the Y-axis direction. The material of the nozzle substrate 60 is not limited to a silicon substrate. For example, a glass substrate, an SOI substrate, various kinds of ceramic substrate, or a metal substrate may be used as the material of the nozzle substrate 60. An example of the metal substrate is a stainless substrate. An organic substance such as polyimide resin may be used as the material of the nozzle substrate 60. However, it is preferable if a material that has substantially the same coefficient of thermal expansion as that of the communication plate 2 is used for the nozzle substrate 60. Using such a "same-thermal-expansion" material makes it possible to suppress the warpage of the nozzle substrate 60 and the communication plate 2 caused due to a difference in the coefficient of thermal expansion when the temperature of the nozzle substrate 60 and the communication plate 2 changes. The −Z-side surface of the nozzle substrate 60, which is one of the surfaces of the nozzle substrate 60, will be referred to also as "top surface TN". As illustrated in FIG. 3, the communication plate 2 is provided on the top surface TN of the nozzle substrate 60.

As illustrated in FIG. 2, the communication plate 2 is a plate-like member that has its longer sides in the Y-axis direction. The communication plate 2 is manufactured by, for example, processing a monocrystalline silicon substrate by using a semiconductor manufacturing technology. The material of the communication plate 2 is not limited to a silicon substrate. For example, the communication plate 2 may be a flat plate-like member formed using a glass substrate, an SOI substrate, various kinds of ceramic substrate, or a metal substrate, etc. An example of the metal substrate is a stainless substrate. It is preferable if a material that has substantially the same coefficient of thermal expansion as that of the pressure compartment substrate 3 is used for the communication plate 2. Using such a "same-thermal-expansion" material makes it possible to suppress the warpage of the pressure compartment substrate 3 and the communication plate 2 caused due to a difference in the coefficient of thermal expansion when the temperature of the pressure compartment substrate 3 and the communication plate 2 changes. In the present embodiment, a case where the number of the communication plate(s) 2 is one is disclosed as an example. However, the number of the communication plate(s) 2 is not limited to one, and may be two or more. One of the surfaces of the communication plate 2, specifically, the −Z-side surface, will be referred to also as "top surface TR", and the other of the surfaces of the communication plate 2, specifically, the +Z-side surface, will be referred to also as "bottom surface BR".

As illustrated in FIGS. 2 and 3, the communication plate 2 has flow passages through which ink flows. The flow passages of the communication plate 2 can be formed by, for example, etching the communication plate 2. As illustrated in FIG. 2, the communication plate 2 has a single common supply flow passage RA1 extending in the Y-axis direction and a single common discharge flow passage RA2 extending in the Y-axis direction. In addition to these common flow passages, as illustrated in FIGS. 2 and 3, the communication plate 2 has M-number of fifth communication passages RR5 corresponding respectively to the M-number of nozzles Nz, M-number of communication flow passages RX1 corresponding respectively thereto, M-number of communication flow passages RK1 corresponding respectively thereto, M-number of first communication passages RR1 corresponding respectively thereto, M-number of third communication passages RR3 corresponding respectively thereto, M-number of fourth communication passages RR4 corresponding respectively thereto, M-number of second communication passages RR2 corresponding respectively thereto, M-number of communication flow passages RK2 corresponding respectively thereto, and M-number of communication flow passages RX2 corresponding respectively thereto. In the present disclosure, each flow path constituted of the communication flow passage RX1, the communication flow passage RK1, the first communication passages RR1, the third communication passage RR3, the fifth communication passage RR5, the fourth communication passage RR4, the second communication passage RR2, the communication flow passage RK2, and the communication flow passage RX2 will be referred to also as "individual flow passage". The communication plate 2 has M-number of individual flow passages formed between the single common supply flow passage RA1 and the single common discharge flow passage RA2. The communication plate 2 may have a single communication flow passage RX1 shared by the M-number of nozzles Nz and a single communication flow passage RX2 shared by the M-number of nozzles Nz instead.

As illustrated in FIG. 3, one end of each communication flow passage RX1 is continuous from the common supply flow passage RA1. The communication flow passage RX1 extends in the −X direction from the common supply flow passage RA1 along the X axis. One end of the communication flow passage RK1 is continuous from the other end of the communication flow passage RX1. The communication flow passage RK1 extends in the −Z direction from the communication flow passage RX1 along the Z axis. The other end of the communication flow passage RK1 is continuous to one end of a first pressure compartment CB1. One end of the first communication passage RR1 is continuous from the other end of the first pressure compartment CB1.

The first communication passage RR1 is provided in the top surface TR of the communication plate 2. The first communication passage RR1 extends in the X-axis direction. The first communication passage RR1 is a flow passage defined by the bottom surface BC of the pressure compartment substrate 3 and a groove formed in the top surface TR of the communication plate 2 by etching the communication plate 2. Among grooves formed in the top surface TR of the communication plate 2, the groove corresponding to the first communication passage RR1 will be referred to also as "first communication plate groove portion". The first communication passage RR1 is formed by sealing the first communication plate groove portion by the bottom surface BC of the pressure compartment substrate 3. One end of the third communication passage RR3 is continuous from the other end of the first communication passage RR1.

The third communication passage RR3 is a through hole extending through the communication plate 2 in the Z-axis direction. The third communication passage RR3 extends from the top surface TR of the communication plate 2 in the +Z direction along the Z axis. The other end of the third communication passage RR3 is continuous to one end of the fifth communication passage RR5.

One nozzle Nz is provided on the fifth communication passage RR5. The fifth communication passage RR5 is provided in the bottom surface BR of the communication plate 2. The fifth communication passage RR5 extends in the X-axis direction. The fifth communication passage RR5 is a flow passage defined by the top surface TN of the nozzle substrate 60 and a groove formed in the bottom surface BR of the communication plate 2 by etching the communication plate 2. Among grooves formed in the bottom surface BR of the communication plate 2, the groove corresponding to the fifth communication passage RR5 will be referred to also as "third communication plate groove portion". The fifth communication passage RR5 is formed by sealing the third communication plate groove portion by the top surface TN of the nozzle substrate 60. One end of the fourth communication passage RR4 is continuous from the other end of the fifth communication passage RR5.

In the present embodiment, the fifth communication passage RR5, the first communication passage RR1, and the second communication passage RR2 are formed through the same wet etching step. By this means, it is possible to simplify manufacturing processes and reduce cost. Moreover, in the present embodiment, by disposing an etching mask at a position where the fifth communication passage RR5 is to be formed and then performing isotropic wet etching, the timing of etching at this position for forming the fifth communication passage RR5 is delayed in relation to the timing of etching for forming the first communication passage RR1 and the second communication passage RR2. That is, the etching rate of the fifth communication passage RR5 is lower than the etching rate of the first communication passage RR1 and the second communication passage RR2. This makes it possible to make the depth D5 of the fifth communication passage RR5 less than the depth D1 of the first communication passage RR1 and less than the depth D2 of the second communication passage RR2. The depth D5 of the fifth communication passage RR5 may be equal to the depth D1 of the first communication passage RR1 and the depth D2 of the second communication passage RR2. If so, it suffices to start the wet etching step of the fifth communication passage RR5, the first communication passage RR1, and the second communication passage RR2 at the same timing without disposing an etching mask.

The fourth communication passage RR4 is a through hole extending through the communication plate 2 in the Z-axis direction. The fourth communication passage RR4 extends from the bottom surface BR of the communication plate 2 in the −Z direction along the Z axis. The other end of the fourth communication passage RR4 is continuous to one end of the second communication passage RR2.

The second communication passage RR2 is provided in the top surface TR of the communication plate 2. The second communication passage RR2 extends in the X-axis direction. The second communication passage RR2 is a flow passage defined by the bottom surface BC of the pressure compartment substrate 3 and a groove formed in the top surface TR of the communication plate 2 by etching the communication plate 2. Among grooves formed in the top surface TR of the communication plate 2, the groove corresponding to the second communication passage RR2 will be referred to also as "second communication plate groove portion". The second communication passage RR2 is formed by sealing the second communication plate groove portion by the bottom surface BC of the pressure compartment substrate 3. One end of a second pressure compartment CB2 is continuous from the other end of the second communication passage RR2.

One end of the communication flow passage RK2 is continuous from the other end of the second pressure compartment CB2. The communication flow passage RK2 extends from the second pressure compartment CB2 in the +Z direction along the Z axis. One end of the communication flow passage RX2 is continuous from the other end of the communication flow passage RK2. The communication flow passage RX2 extends in the −X direction from the communication flow passage RK2 along the X axis. The other end of the communication flow passage RX2 is continuous to the common discharge flow passage RA2.

As illustrated in FIGS. 2 and 3, the compliance sheet 61 and the compliance sheet 62 are provided on the bottom surface BR of the communication plate 2 at respective sides in the width direction. The compliance sheet 61 seals the common supply flow passage RA1, the communication flow passage RX1, and the communication flow passage RK1. As the material of the compliance sheet 61, for example, an elastic material is used. The compliance sheet 61 absorbs the pressure fluctuations of ink inside the common supply flow passage RA1, the communication flow passage RX1, and the communication flow passage RK1. The compliance sheet 62 seals the common discharge flow passage RA2, the communication flow passage RX2, and the communication flow passage RK2. The compliance sheet 62 is made of, for example, an elastic material, and absorbs the pressure fluctuations of ink inside the common discharge flow passage RA2, the communication flow passage RX2, and the communication flow passage RK2.

As illustrated in FIGS. 2 and 3, the reservoir forming substrate 5 is provided on the top surface TR of the communication plate 2. As illustrated in FIG. 2, the reservoir forming substrate 5 is a member that has its longer sides in the Y-axis direction. The reservoir forming substrate 5 is, for example, formed by injection molding using a resin material. Flow passages through which ink flows are formed inside the reservoir forming substrate 5. Specifically, as illustrated in FIG. 3, the reservoir forming substrate 5 has a single common supply flow passage RB1 and a single common discharge flow passage RB2. The common supply flow passage RB1 is in communication with the common supply flow passage RA1. The common discharge flow passage RB2 is in communication with the common discharge flow passage RA2.

The reservoir forming substrate 5 further has an inlet 51 and an outlet 52. The inlet 51 is in communication with the common supply flow passage RB1. The outlet 52 is in communication with the common discharge flow passage RB2. Ink supplied from the liquid container 93 flows into the common supply flow passage RB1 through the inlet 51. Ink flowing into the common discharge flow passage RB2 flows out through the outlet 52 and is then collected to the liquid container 93.

As illustrated in FIG. 2, the reservoir forming substrate 5 has an opening portion 50. The pressure compartment substrate 3, the diaphragm 4, and the wiring substrate 8 are disposed inside the opening portion 50. A protective member for protecting first piezoelectric elements PZ1 and second piezoelectric elements PZ2 may be also provided inside the opening portion 50.

As illustrated in FIG. 2, the pressure compartment substrate 3 is a plate-like member that has its longer sides in the Y-axis direction. As illustrated in FIG. 3, the pressure compartment substrate 3 is provided on the top surface TR of the communication plate 2. The pressure compartment substrate 3 is manufactured by, for example, processing a monocrystalline silicon substrate by using a semiconductor manufacturing technology. Flow passages through which ink flows are formed in the pressure compartment substrate 3. Specifically, the pressure compartment substrate 3 has M-number of first pressure compartments CB1 corresponding respectively to the M-number of nozzles Nz, and M-number of second pressure compartments CB2 corresponding respectively to the M-number of nozzles Nz. The material of the pressure compartment substrate 3 is not limited to a silicon substrate. For example, the pressure compartment substrate 3 may be formed using a glass substrate, an SOI substrate, various kinds of ceramic substrate, etc. The +Z-side surface of the pressure compartment substrate 3, which is one of the surfaces of the pressure compartment substrate 3, will be referred to also as "bottom surface BC", and the −Z-side surface of the pressure compartment substrate 3, which is the other of the surfaces of the pressure compartment substrate 3, will be referred to also as "top surface TC".

The first pressure compartment CB1 extends in the X-axis direction such that the communication flow passage RK1 is in communication with the first communication passage RR1 through the first pressure compartment CB1. The second pressure compartment CB2 extends in the X-axis direction such that the second communication passage RR2 is in communication with the communication flow passage RK2 through the second pressure compartment CB2. In the description below, the first pressure compartment CB1 and the second pressure compartment CB2 will be collectively referred to also as "pressure compartment CBq" when no distinction is made therebetween.

As illustrated in FIG. 2, the diaphragm 4 is a plate-like member that has its longer sides in the Y-axis direction. As illustrated in FIG. 3, the diaphragm 4 is provided on the top surface TC of the pressure compartment substrate 3. The diaphragm 4 is a member that is able to be elastically vibrated, and applies pressure to the ink present inside the pressure compartment CBq. The diaphragm 4 may be, for example, made up of an elastic film provided on the pressure compartment substrate 3 and made of silicon oxide and an insulation film provided on the elastic film and made of zirconium oxide. On the top surface of the diaphragm 4, M-number of first piezoelectric elements PZ1 corresponding respectively to the M-number of first pressure compartments CB1, and M-number of second piezoelectric elements PZ2 corresponding respectively to the M-number of second pressure compartments CB2, are provided. In the description below, the first piezoelectric element PZ1 and second piezoelectric element PZ2 will be collectively referred to also as "piezoelectric element PZq" when no distinction is made therebetween. The piezoelectric element PZq is an energy conversion element that converts the electric energy of the drive signal Com into motion energy. In the present embodiment, the piezoelectric element PZq is a passive element that deforms in response to a change in potential of the drive signal Com.

The wiring substrate 8 is mounted between the first piezoelectric elements PZ1 and second piezoelectric elements PZ2 on the −Z-directional side with respect to the diaphragm 4. The wiring substrate 8 is a part for electric coupling between the control device 90 and the liquid ejecting head 1. The wiring substrate 8 supplies power to the first piezoelectric elements PZ1 and second piezoelectric elements PZ2. A flexible wiring board such as, for example, FPC or FFC is used as the wiring substrate 8. A drive circuit 81 is mounted on the wiring substrate 8. Based on the control signal SI, the drive circuit 81 switches whether or not to supply the drive signal Com to the piezoelectric element PZq.

As illustrated in FIG. 5, the piezoelectric element PZq has a layered structure in which a piezoelectric material ZMq is sandwiched between a lower electrode ZDq and an upper electrode ZUq. The pressure compartment CBq is provided on the +Z-directional side with respect to the piezoelectric element PZq. A predetermined reference potential is supplied to the lower electrode ZDq. The drive circuit 81 supplies the drive signal Com to the upper electrode ZUq via a wiring line 810. The drive signal Com supplied to the first piezoelectric element PZ1 will be referred to also as "drive signal Com1". The drive signal Com supplied to the second piezoelectric element PZ2 will be referred to also as "drive signal Com2". In the present embodiment, when ink is ejected from the nozzle Nz, the waveform of the drive signal Com1 supplied by the drive circuit 81 to the first piezoelectric element PZ1 corresponding to the nozzle Nz and the waveform of the drive signal Com2 supplied by the drive circuit 81 to the second piezoelectric element PZ2 corresponding to the nozzle Nz are substantially the same as each other.

The piezoelectric element PZq is configured to deform in response to a change in potential of the drive signal Com. The diaphragm 4 vibrates by being driven by the deformation of the piezoelectric element PZq. The vibration of the diaphragm 4 causes a change in the internal pressure of the pressure compartment CBq. Due to the change in the internal pressure of the pressure compartment CBq, the ink having been filled into the pressure compartment CBq is ejected from the nozzle Nz after flowing through the first/second communication passage RR1/RR2, the third/fourth communication passage RR3/RR4, and the fifth communication passage RR5. More specifically, when the first piezoelectric element PZ1 is driven by the drive signal Com1, a part of the ink having been filled into the first pressure compartment CB1 is ejected from the nozzle Nz after flowing through the first communication passage RR1, the third communication passage RR3, and the fifth communication passage RR5. When the second piezoelectric element PZ2 is driven by the drive signal Com2, a part of the ink having been filled into the second pressure compartment CB2 is ejected from the nozzle Nz after flowing through the second communication passage RR2, the fourth communication passage RR4, and the fifth communication passage RR5.

As illustrated in FIG. 3, the ink having been supplied from the liquid container 93 by the circulation mechanism 94 and having entered through the inlet 51 flows through the common supply flow passage RB1 into the common supply flow passage RA1. A part of the ink having flowed into the common supply flow passage RA1 branches into the communication flow passage RX1 of each individual flow passage. The ink having flowed into the communication flow passage RX1 flows through the communication flow passage RK1 into the first pressure compartment CB1. A part of the ink having flowed into the first pressure compartment CB1 flows through the first communication passage RR1, the third communication passage RR3, the fifth communication passage RR5, the fourth communication passage RR4, and the second communication passage RR2 in this order, and then flows into the second pressure compartment CB2. A part of the ink having flowed into the second pressure compartment CB2 flows through the communication flow passage RK2 and the communication flow passage RX2 in this order, and then merges with the ink of the other branches at the common discharge flow passage RA2. The ink having flowed into the common discharge flow passage RA2 flows through the common discharge flow passage RB2 and then exits through the outlet 52. The flow path of ink from the common supply flow passage RA1 to the common discharge flow passage RA2 illustrated in FIG. 4 will be referred to also as "circulation flow passage RJ". Specifically, the circulation flow passage RJ includes the common supply flow passage RA1, the individual flow passages, and the common discharge flow passage RA2.

The liquid ejecting apparatus 100 according to the present embodiment causes the ink to circulate from the common supply flow passage RA1 to the common discharge flow passage RA2 through the individual flow passage. For this reason, even if there exists a period in which the ink present inside the pressure compartment CBq is not ejected from the nozzle Nz, it is possible to prevent or reduce the staying of the ink inside the pressure compartment CBq. Therefore, even if the viscosity of the ink inside the nozzle Nz increases due to the evaporation of the liquid component of the ink from the nozzle Nz during the period in which the ink present inside the pressure compartment CBq is not ejected from the nozzle Nz, the liquid ejecting apparatus 100 according to the present embodiment makes it possible to discharge the ink from the inside of the nozzle Nz toward the common discharge flow passage RA2 by performing ink circulation. This makes it possible to prevent or reduce abnormal ejection status, meaning that the ink cannot be ejected from the nozzle Nz properly, arising from the staying of the thickened ink inside the nozzle Nz, and thus prevent or reduce a decrease in ink ejection performance.

The liquid ejecting apparatus 100 according to the present embodiment ejects, from one nozzle Nz, the ink having been filled into the first pressure compartment CB1 and the ink having been filled into the second pressure compartment CB2. Therefore, for example, in comparison with a structure in which the ink of one pressure compartment CBq only is ejected from the nozzle Nz, the liquid ejecting apparatus 100 according to the present embodiment is able to make the amount of the ink ejected from the nozzle Nz larger.

Figure 6:
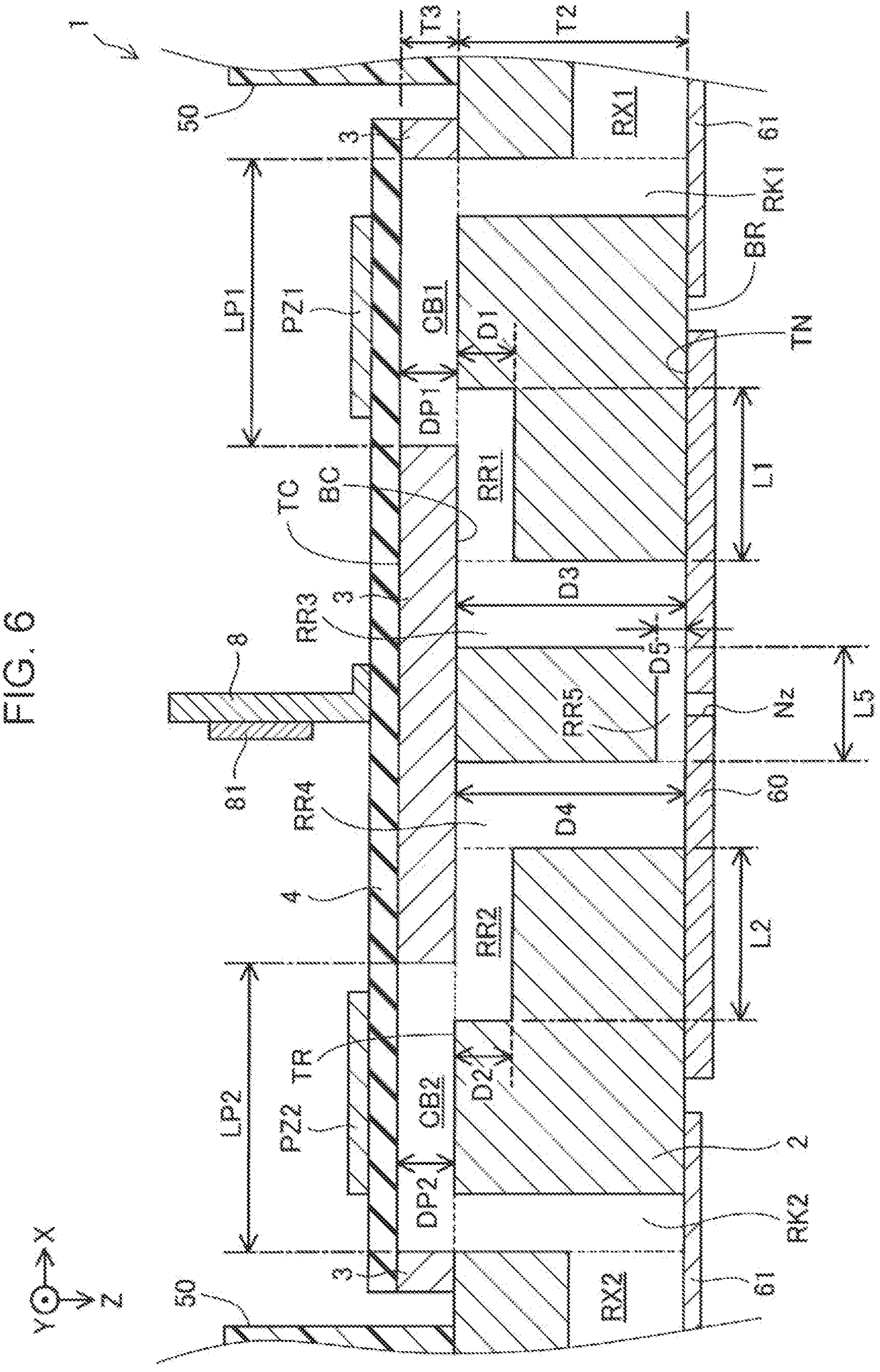
FIG. 6 is an enlarged cross-sectional view for explaining flow passages in the neighborhood of a nozzle in the liquid ejecting head.

With reference to FIG. 6, the flow-passage design of the liquid ejecting head 1 in the neighborhood of the nozzle Nz will now be explained in detail. FIG. 6 is an enlarged cross-sectional view for explaining flow passages in the neighborhood of the nozzle Nz in the liquid ejecting head 1. The cross-sectional view in FIG. 6 corresponds to an enlarged view in the neighborhood of the nozzle Nz in FIG. 3. In FIG. 6, in order to facilitate the readers' understanding of the disclosed technique, broken lines are used for schematically illustrating boundaries between flow passages. In the present disclosure, the length of a flow passage in the X-axis direction will be referred to also as "width", and the length of a flow passage in the Z-axis direction will be referred to also as "depth".

As illustrated in FIG. 6, the width L1 of the first communication passage RR1 is designed to be shorter than the width LP1 of the first pressure compartment CB1. In the present embodiment, the width L1 of the first communication passage RR1 is set to be 3/5 of the width LP1 of the first pressure compartment CB1. The width L1 of the first communication passage RR1 is not limited to 3/5 of the width LP1 of the first pressure compartment CB1. The width L1 of the first communication passage RR1 may be set at any ratio, for example, 2/3, 1/3, 1/4, 3/4, 4/5, 2/5, or 1/5, etc. with respect to the width LP1 of the first pressure compartment CB1. The width L1 of the first communication passage RR1 does not necessarily have to be shorter than the width LP1 of the first pressure compartment CB1. The width L1 may be set to be not shorter than the width LP1.

The width L2 of the second communication passage RR2 is designed to be shorter than the width LP2 of the second pressure compartment CB2. In the present embodiment, the width L2 of the second communication passage RR2 is set to be ⅗ of the width LP2 of the second pressure compartment CB2. The width L2 of the second communication passage RR2 is not limited to ⅗ of the width LP2 of the second pressure compartment CB2. The width L2 of the second communication passage RR2 may be set at any ratio, for example, 2/3, 1/3, 1/4, 3/4, 4/5, 2/5, or 1/5, etc. with respect to the width LP2 of the second pressure compartment CB2. The width L2 of the second communication passage RR2 does not necessarily have to be shorter than the width LP2 of the second pressure compartment CB2. The width L2 may be set to be not shorter than the width LP2.

In the present embodiment, the width L5 of the fifth communication passage RR5 is designed to be shorter than the width L1 of the first communication passage RR1 and shorter than the width L2 of the second communication passage RR2. Therefore, in the present embodiment, the width L5 of the fifth communication passage RR5 is shorter than a sum of the width L1 of the first communication passage RR1 and the width L2 of the second communication passage RR2. The width L5 may be designed to be shorter than only either one of the width L1 and the width L2. In this case, it is preferable if the width L5 is shorter than a sum of the width L1 and the width L2, but not limited thereto; for example, the width L5 may be not shorter than the sum of the width L1 and the width L2.

The width L5 of the fifth communication passage RR5 is set to be ⅔ of the width L1 of the first communication passage RR1. The width L5 of the fifth communication passage RR5 is not limited to ⅔ of the width L1 of the first communication passage RR1. The width L5 of the fifth communication passage RR5 may be set at any ratio, for example, 1/3, 1/4, 3/4, 4/5, 3/5, 2/5, or 1/5, etc. with respect to the width L1 of the first communication passage RR1. The width L5 of the fifth communication passage RR5 does not necessarily have to be shorter than the width L1 of the first communication passage RR1. For example, if the distance from the first pressure compartment CB1 to the nozzle Nz is short and if the width L1 is therefore not so long, the width L5 may be set to be not shorter than the width L1.

The width L5 of the fifth communication passage RR5 is set to be ⅔ of the width L2 of the second communication passage RR2. The width L5 of the fifth communication passage RR5 is not limited to ⅔ of the width L2 of the second communication passage RR2. The width L5 of the fifth communication passage RR5 may be set at any ratio, for example, 1/3, 1/4, 3/4, 4/5, 3/5, 2/5, or 1/5, etc. with respect to the width L2 of the second communication passage RR2. The width L5 of the fifth communication passage RR5 does not necessarily have to be shorter than the width L2 of the second communication passage RR2. For example, if the distance from the second pressure compartment CB2 to the nozzle Nz is short and if the width L2 is therefore not so long, the width L5 may be set to be not shorter than the width L2.

In the present embodiment, in addition, the width L5 of the fifth communication passage RR5 is designed to be shorter than the width LP1 of the first pressure compartment CB1 and shorter than the width LP2 of the second pressure compartment CB2. Therefore, in the present embodiment, the width L5 of the fifth communication passage RR5 is shorter than a sum of the width LP1 of the first pressure compartment CB1 and the width LP2 of the second pressure compartment CB2. However, the width L5 may be designed to be shorter than only either one of the width LP1 and the width LP2. In this case, it is preferable if the width L5 is shorter than a sum of the width LP1 and the width LP2, but not limited thereto; for example, the width L5 may be not shorter than the sum of the width LP1 and the width LP2.

In the present embodiment, the width L5 is designed to be shorter than a sum of the width L1, the width L2, the width LP1, and the width LP2, but not limited thereto; for example, the width L5 may be not shorter than the sum of the width L1 and the width L2.

The width L5 of the fifth communication passage RR5 is set to be ⅖ of the width LP1 of the first pressure compartment CB1. The width L5 of the fifth communication passage RR5 is not limited to ⅖ of the width LP1 of the first pressure compartment CB1. The width L5 of the fifth communication passage RR5 may be set at any ratio, for example, 2/3, 1/3, 1/4, 3/4, 4/5, 3/5, or 1/5, etc. with respect to the width LP1 of the first pressure compartment CB1. The width L5 of the fifth communication passage RR5 does not necessarily have to be shorter than the width LP1 of the first pressure compartment CB1. For example, if the width LP1 is not so long, the width L5 may be set to be not shorter than the width LP1.

The width L5 of the fifth communication passage RR5 is set to be ⅖ of the width LP2 of the second pressure compartment CB2. The width L5 of the fifth communication passage RR5 is not limited to ⅖ of the width LP2 of the second pressure compartment CB2. The width L5 of the fifth communication passage RR5 may be set at any ratio, for example, 2/3, 1/3, 1/4, 3/4, 4/5, 3/5, or 1/5, etc. with respect to the width LP2 of the second pressure compartment CB2. The width L5 of the fifth communication passage RR5 does not necessarily have to be shorter than the width LP2 of the second pressure compartment CB2. For example, if the width LP2 is not so long, the width L5 may be set to be not shorter than the width LP2.

As illustrated in FIG. 6, in the present embodiment, the internal ink flow passages of the liquid ejecting head 1, specifically, the first pressure compartment CB1, the second pressure compartment CB2, and ink flow passages formed inside the communication plate 2, constitute a line-symmetric structure with respect to the Z axis including the nozzle Nz. That is, the width L1 of the first communication passage RR1 is set to be substantially the same as the width L2 of the second communication passage RR2. In addition, in the present embodiment, the width LP1 of the first pressure compartment CB1 and the width LP2 of the second pressure compartment CB2 are substantially the same as each other, and the width L1 of the first communication passage RR1 and the width L2 of the second communication passage RR2 are substantially the same as each other. The structure of the internal ink flow passages of the liquid ejecting head 1 is not limited to a line-symmetric structure. For example, the width LP1 of the first pressure compartment CB1 and the width LP2 of the second pressure compartment CB2 may be different from each other, and the width L1 of the first communication passage RR1 and the width L2 of the second communication passage RR2 may be different from each other.

In FIG. 6, the thickness T2 of the communication plate 2 and the thickness T3 of the pressure compartment substrate 3 are schematically illustrated. The depth D3 of the third communication passage RR3, which is a through hole formed in the communication plate 2, and the depth D4 of the fourth communication passage RR4, which is another through hole formed in the communication plate 2, are the same as the thickness T2 of the communication plate 2. The depth DP1 of the first pressure compartment CB1 and the depth DP2 of the second pressure compartment CB2 are the same as the thickness T3 of the pressure compartment substrate 3. As illustrated in FIG. 6, the thickness T2 of the communication plate 2 is greater than the thickness T3 of the pressure compartment substrate 3. The ratio between the thickness T2 and the thickness T3 may be set arbitrarily. In the present embodiment, the thickness T2 is set to be approximately four to six times as great as the thickness T3.

The depth D5 of the fifth communication passage RR5 is designed to be less than the depth DP1 of the first pressure compartment CB1 and less than the depth DP2 of the second pressure compartment CB2. The ratio between the depth D5 and the depth DP1, and the ratio between the depth D5 and the depth DP2, may be set arbitrarily. For example, the depth D5 may be set to be approximately 20% to 80% of the depth DP1 and the depth DP2. In the present embodiment, the depth D5 is approximately 70% of the depth DP1 and the depth DP2. However, the depth D5 may be approximately the same as the depth DP1. The depth D5 may be equal to the depth DP1. The depth D5 may be approximately the same as the depth DP2. The depth D5 may be equal to the depth DP2.

In addition, the depth D5 of the fifth communication passage RR5 is designed to be less than the depth D1 of the first communication passage RR1 and less than the depth D2 of the second communication passage RR2. The ratio between the depth D5 and the depth D1, and the ratio between the depth D5 and the depth D2, may be set arbitrarily. For example, the depth D5 may be set to be approximately 20% to 80% of the depth D1 and the depth D2. In the present embodiment, the depth D5 is approximately 70% of the depth D1 and the depth D2. In the present embodiment, the depth D1 of the first communication passage RR1 is set to be substantially the same as the depth DP1 of the first pressure compartment CB1, and the depth D2 of the second communication passage RR2 is set to be substantially the same as the depth DP2 of the second pressure compartment CB2. However, the depth D5 may be approximately the same as the depth D1. The depth D5 may be equal to the depth D1. The depth D5 may be approximately the same as the depth D2. The depth D5 may be equal to the depth D2.

Figure 7:
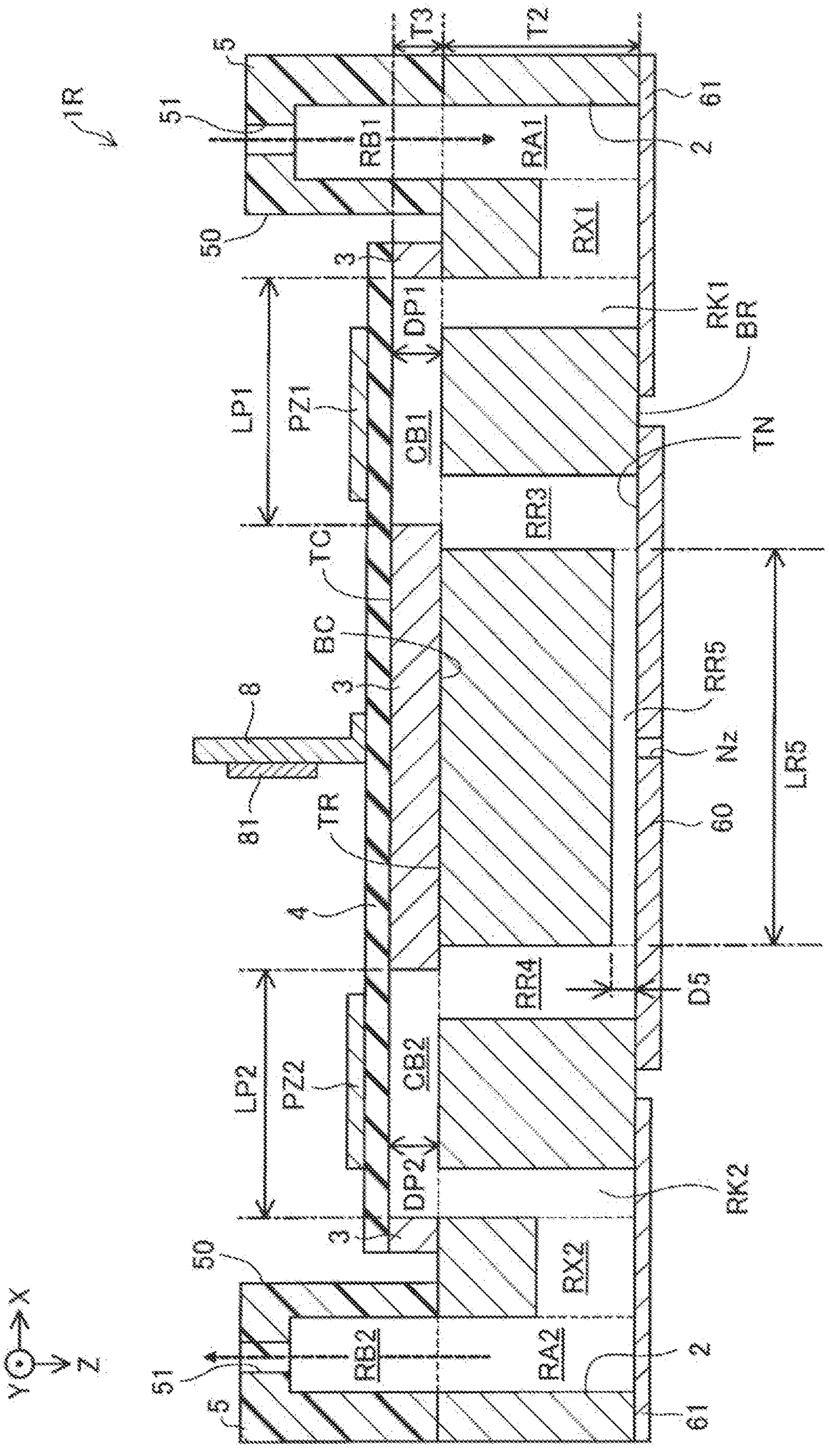
FIG. 7 is a cross-sectional view schematically illustrating the internal ink flow passages of a liquid ejecting head according to related art shown as a comparative example.

FIG. 7 is a cross-sectional view schematically illustrating the internal ink flow passages of a liquid ejecting head 1R according to related art shown as a comparative example. As illustrated in FIG. 7, the internal ink flow passages of the communication plate 2 of the liquid ejecting head 1R are different from those of the liquid ejecting head 1 according to the present embodiment. Specifically, the liquid ejecting head 1R does not include the first communication passage RR1 and the second communication passage RR2 of the liquid ejecting head 1 according to the present embodiment. The structure of the first pressure compartment CB1 and the second pressure compartment CB2 and the third communication passage RR3 and the fourth communication passage RR4 of the liquid ejecting head 1R is the same as the structure of those of the liquid ejecting head 1 according to the present embodiment. The distance between the first piezoelectric element PZ1 and second piezoelectric element PZ2 of the liquid ejecting head 1R is the same as the distance between these piezoelectric elements of the liquid ejecting head 1. The distance between the first pressure compartment CB1 and the second pressure compartment CB2 of the liquid ejecting head 1R is the same as the distance between these pressure compartments of the liquid ejecting head 1.

In the liquid ejecting head 1R, the third communication passage RR3 is provided on the +Z-directional side continuously from the other end of the first pressure compartment CB1, and the fourth communication passage RR4 is provided on the +Z-directional side continuously to one end of the second communication passage RR2. In the bottom surface BR of the communication plate 2, the fifth communication passage RR5 is provided between the third communication passage RR3 and the fourth communication passage RR4. The width LR5 of the fifth communication passage RR5 of the liquid ejecting head 1R is longer than the width L5 of the fifth communication passage RR5 according to the present embodiment. Specifically, the width LR5 is longer than the width L5 by a difference corresponding to the sum of the width L1 of the first communication passage RR1 and the width L2 of the second communication passage RR2.

In the liquid ejecting head 1R, the ink forced out of the first pressure compartment CB1 due to pressure applied inside the first pressure compartment CB1 by the first piezoelectric element PZ1 flows into the third communication passage RR3 and then flows in the +Z direction. The ink having reached the other end of the third communication passage RR3 flows into the fifth communication passage RR5, and the direction of its flow is switched to the −X direction. Similarly, the ink forced out of the second pressure compartment CB2 due to pressure applied inside the second pressure compartment CB2 by the second piezoelectric element PZ2 flows into the fourth communication passage RR4 and then flows in the +Z direction. The ink having reached one end of the fourth communication passage RR4 flows into the fifth communication passage RR5, and the direction of its flow is switched to the +X direction. Therefore, in the fifth communication passage RR5, the ink supplied from the fourth communication passage RR4 and flowing in the +X direction collides with the ink supplied from the third communication passage RR3 and flowing in the −X direction. The ink flowing in the fifth communication passage RR5 is ejected from the nozzle Nz. In the liquid ejecting head 1R, as compared with the liquid ejecting head 1 according to the present embodiment, since the width LR5 of the fifth communication passage RR5 is longer, the collision of the ink inside the fifth communication passage RR5 is more likely to occur, and obstruction to or stagnation in ink flow, etc. are more likely to occur. If this happens, there is a possibility that sufficient performance of ink ejection from the nozzle Nz might not be obtained.

In the liquid ejecting head 1R according to related art, the duration of stay of ink inside the fifth communication passage RR5 is longer because of its longer width than the fifth communication passage RR5 according to the present embodiment. For this reason, for example, the ink present inside the fifth communication passage RR5 is more prone to dissipate heat to the outside of the liquid ejecting head 1R through the nozzle substrate 60. Due to this heat dissipation, the temperature of the ink might become lower than its supposed temperature. Such a change in ink temperature causes a change in ink viscosity. Ink viscosity could have a significant influence of ejection characteristics. For this reason, in the liquid ejecting head 1R according to related art, there is a risk that actual ejection characteristics might deviate from desired ejection characteristics due to the dissipation of heat from the ink present inside the fifth communication passage RR5.

By contrast, in the liquid ejecting head 1 according to the present embodiment, there exist the first communication passage RR1 and the second communication passage RR2 in communication with the first pressure compartment CB1 and the second pressure compartment CB2 respectively. By forming these flow passages each extending along the X axis in a direction of coming closer to the nozzle Nz from the pressure compartment CBq, the width L5 of the fifth communication passage RR5, which is located immediately above the nozzle Nz, is set to be shorter than that of the liquid ejecting head 1R according to related art.

Since the distance from the third communication passage RR3 to the nozzle Nz and the distance from the fourth communication passage RR4 to the nozzle Nz are shorter, it is easier for the Z-directional motion energy of ink to remain immediately above the nozzle Nz, as compared with the liquid ejecting head 1R according to related art. Therefore, it could be easier to eject the ink from the nozzle Nz, as compared with the liquid ejecting head 1R according to related art, in which the distance from the third communication passage RR3 to the nozzle Nz and the distance from the fourth communication passage RR4 to the nozzle Nz are longer. Moreover, the X-directional motion energy of the ink inside the fifth communication passage RR5 is weaker than that of related art, and there is a possibility that the weaker X-directional motion energy will mitigate obstruction to or stagnation in ink flow otherwise caused by ink collision.

In the liquid ejecting head 1 according to the present embodiment, the duration of stay of ink inside the fifth communication passage RR5 is made shorter by making the width L5 of the fifth communication passage RR5 shorter than that of related art. Therefore, in the liquid ejecting head 1 according to the present embodiment, it is possible to reduce a change in temperature and a change in viscosity of ink by making the ink present inside the fifth communication passage RR5 less prone to dissipate heat to the outside of the liquid ejecting head 1R through the nozzle substrate 60, thereby preventing or reducing a decrease in ink ejection performance.

Furthermore, in the liquid ejecting head 1 according to the present embodiment, by providing the first communication passage RR1 and the second communication passage RR2 in the top surface TR of the communication plate 2, it is possible to provide ink flow passages at positions closer to the wiring substrate 8 mounted between the first piezoelectric element PZ1 and second piezoelectric element PZ2 than related art. Therefore, it is easier to transfer heat generated by the wiring substrate 8 to the ink present inside the flow passages. Therefore, even when the dissipation of heat from ink present inside the fifth communication passage RR5 occurs, it is possible to keep the temperature of ink inside the first communication passage RR1 and the second communication passage RR2, thereby preventing or reducing a change in temperature and a change in viscosity of the ink more effectively. Consequently, it is possible to prevent or reduce a decrease in performance of ejecting the ink from the nozzle Nz, as compared with the liquid ejecting head 1R according to related art.

As explained above, the liquid ejecting head 1 according to the present embodiment includes: the first pressure compartment CB1 extending in a first direction; the second pressure compartment CB2 extending in the first direction; the first communication passage RR1 continuous from the first pressure compartment CB1 and extending in the first direction; the second communication passage RR2 continuous to the second pressure compartment CB2 and extending in the first direction; the third communication passage RR3 continuous from the first communication passage RR1 and extending in a second direction intersecting with the first direction; the fourth communication passage RR4 continuous to the second communication passage RR2 and extending in the second direction; the fifth communication passage RR5 continuous from the third communication passage RR3 and continuous to the fourth communication passage RR4 and extending in the first direction; and the nozzle Nz provided on the fifth communication passage RR5. Since the liquid ejecting head 1 according to the present embodiment includes the first communication passage RR1 extending from the first pressure compartment CB1 in the X-axis direction and the second communication passage RR2 extending from the second pressure compartment CB2 in the X-axis direction, it is possible to make the width L5 of the fifth communication passage RR5 shorter. Therefore, inside the fifth communication passage RR5, it is easier for the Z-directional motion energy of ink supplied from the third communication passage RR3 and the Z-directional motion energy of ink supplied from the fourth communication passage RR4 to remain, and it is therefore easier to eject the ink from the nozzle Nz, as compared with the liquid ejecting head 1R according to related art. Moreover, the X-directional motion energy of the ink inside the fifth communication passage RR5 is weaker than that of related art, and there is a possibility that the weaker X-directional motion energy will mitigate obstruction to or stagnation in ink flow otherwise caused by ink collision. Therefore, it is possible to prevent or reduce a decrease in performance of ejecting the ink from the nozzle Nz. Moreover, by making the duration of stay of the ink inside the fifth communication passage RR5 shorter than that of related art, it is possible to reduce problems that the ink present inside the fifth communication passage RR5 is affected by the influence of external heat through the nozzle substrate 60 and thus prevent or reduce a decrease in ink ejection performance.

In the liquid ejecting head 1 according to the present embodiment, the width L5 of the fifth communication passage RR5 is shorter than the width L1 of the first communication passage RR1 and shorter than the width L2 of the second communication passage RR2. By setting the width L5 of the fifth communication passage RR5 to be shorter than the width L1 of the first communication passage RR1 and shorter than the width L2 of the second communication passage RR2 among flow passages extending in the X-axis direction, it is possible to further reduce the width L5 of the fifth communication passage RR5 and thus prevent or reduce a decrease in ink ejection performance.

In the liquid ejecting head 1 according to the present embodiment, the width L5 of the fifth communication passage RR5 is shorter than a sum of the width L1 of the first communication passage RR1 and the width L2 of the second communication passage RR2. By setting the width L5 of the fifth communication passage RR5 to be shorter than a sum of the width L1 of the first communication passage RR1 and the width L2 of the second communication passage RR2 among flow passages extending in the X-axis direction, it is possible to further reduce the width L5 of the fifth communication passage RR5 and thus prevent or reduce a decrease in ink ejection performance.

In the liquid ejecting head 1 according to the present embodiment, the width L5 of the fifth communication passage RR5 is shorter than the width LP1 of the first pressure compartment CB1 and shorter than the width LP2 of the second pressure compartment CB2. By setting the width L5 of the fifth communication passage RR5 to be shorter than the width LP1 of the first pressure compartment CB1 and shorter than the width LP2 of the second pressure compartment CB2 among flow passages extending in the X-axis direction, it is possible to further reduce the width L5 of the fifth communication passage RR5 and thus prevent or reduce a decrease in ink ejection performance.

In the liquid ejecting head 1 according to the present embodiment, the width L1 of the first communication passage RR1 is shorter than the width LP1 of the first pressure compartment CB1, and the width L2 of the second communication passage RR2 is shorter than the width LP2 of the second pressure compartment CB2. If the width L1 of the first communication passage RR1 is not shorter than the width LP1 of the first pressure compartment CB1 and if the width L2 of the second communication passage RR2 is not shorter than the width LP2 of the second pressure compartment CB2, the entire ink flow path could be excessively long; avoiding such an excessive length makes it possible to prevent or reduce a decrease in ink ejection performance and possible to prevent or suppress the size of the liquid ejecting head 1 from being excessively large.

In the liquid ejecting head 1 according to the present embodiment, the depth D5 of the fifth communication passage RR5 is less than the depth D1 of the first communication passage RR1 and less than the depth D2 of the second communication passage RR2. Designing the cross-sectional flow-passage area size of the first communication passage RR1 and the second communication passage RR2 to be large makes it possible to reduce flow-passage resistance inside the first communication passage RR1 and the second communication passage RR2. In addition, it is possible to enhance ink ejection performance by making the flow velocity of the ink inside the fifth communication passage RR5, in which the ink is susceptible to the influence of external air and therefore tends to increase in viscosity, higher.

In the liquid ejecting head 1 according to the present embodiment, the depth D5 of the fifth communication passage RR5 is less than the depth DP1 of the first pressure compartment CB1 and less than the depth DP2 of the second pressure compartment CB2. Designing the cross-sectional flow-passage area size of the first pressure compartment CB1 and the second pressure compartment CB2 to be large makes it possible to reduce flow-passage resistance inside the first pressure compartment CB1 and the second pressure compartment CB2. In addition, it is possible to enhance ink ejection performance by making the flow velocity of the ink inside the fifth communication passage RR5, in which the ink is susceptible to the influence of external air and therefore tends to increase in viscosity, higher.

In the liquid ejecting head 1 according to the present embodiment, the first communication passage RR1 is defined by the first communication plate groove portion, which is formed in the top surface TR of the communication plate 2, and the bottom surface BC of the pressure compartment substrate 3, which faces the top surface TR of the communication plate 2. The second communication passage RR2 is defined by the second communication plate groove portion, which is formed in the top surface TR of the communication plate 2, and the bottom surface BC of the pressure compartment substrate 3, which faces the top surface TR of the communication plate 2. Therefore, flow-passage connection between the first communication passage RR1 and the first pressure compartment CB1 and between the second communication passage RR2 and the second pressure compartment CB2 is made easier. Moreover, as compared with a structure in which the first communication passage RR1 and the second communication passage RR2 are formed at the center of the communication plate 2 in the thickness direction, it is easier to form the first communication passage RR1 and the second communication passage RR2 in the communication plate 2.

In the liquid ejecting head 1 according to the present embodiment, the third communication passage RR3, the fourth communication passage RR4, and the fifth communication passage RR5 are provided in the communication plate 2. Therefore, as compared with a structure in which the third communication passage RR3, the fourth communication passage RR4, and the fifth communication passage RR5 are formed in a plurality of substrates, the manufacturing of the structure of the embodiment is easier.

In the liquid ejecting head 1 according to the present embodiment, each of the third communication passage RR3 and the fourth communication passage RR4 is a through hole extending through the communication plate 2 in the Z-axis direction. The fifth communication passage RR5 is defined by the third communication plate groove portion, which is formed in the bottom surface BR of the communication plate 2, and the top surface TN of the nozzle substrate 60. As compared with a structure in which the fifth communication passage RR5 is formed at the center of the communication plate 2 in the thickness direction, it is easier to form the fifth communication passage RR5.

In the liquid ejecting head 1 according to the present embodiment, the thickness T2 of the communication plate 2 is greater than the thickness T3 of the pressure compartment substrate 3. Therefore, it is easier to form a plurality of flow passages in the communication plate 2.

The liquid ejecting head 1 according to the present embodiment further includes: the first piezoelectric element PZ1 that changes pressure in the first pressure compartment CB1; the second piezoelectric element PZ2 that changes pressure in the second pressure compartment CB2; and the wiring substrate 8 that is provided between the first piezoelectric element PZ1 and the second piezoelectric element PZ2 and supplies power to the first piezoelectric element PZ1 and the second piezoelectric element PZ2. Providing the first communication passage RR1 and the second communication passage RR2 at positions near the wiring substrate 8 makes the transfer of heat from the wiring substrate 8 to the ink easier. Easier heat transfer prevents or reduces, for example, problems arising from ink viscosity and thus prevents or reduces a decrease in performance of ejecting the ink from the nozzle Nz.

The liquid ejecting head 1 according to the present embodiment further includes a plurality of individual flow passages. Each of the plurality of individual flow passages includes the first pressure compartment CB1, the second pressure compartment CB2, the first communication passage RR1, the second communication passage RR2, the third communication passage RR3, the fourth communication passage RR4, and the fifth communication passage RR5. The liquid ejecting head 1 according to the present embodiment further includes the common supply flow passage RA1, which is a common passage in communication with the plurality of individual flow passages and through which ink is supplied to each of the plurality of individual flow passages, and the common discharge flow passage RA2, which is a common passage in communication with the plurality of individual flow passages and through which the ink exits from each of the plurality of individual flow passages. This makes it possible to prevent or reduce a decrease in performance of ejecting the ink from the nozzle Nz in the liquid ejecting head 1 having an ink-circulating structure.

B. Second Embodiment

Figure 8:
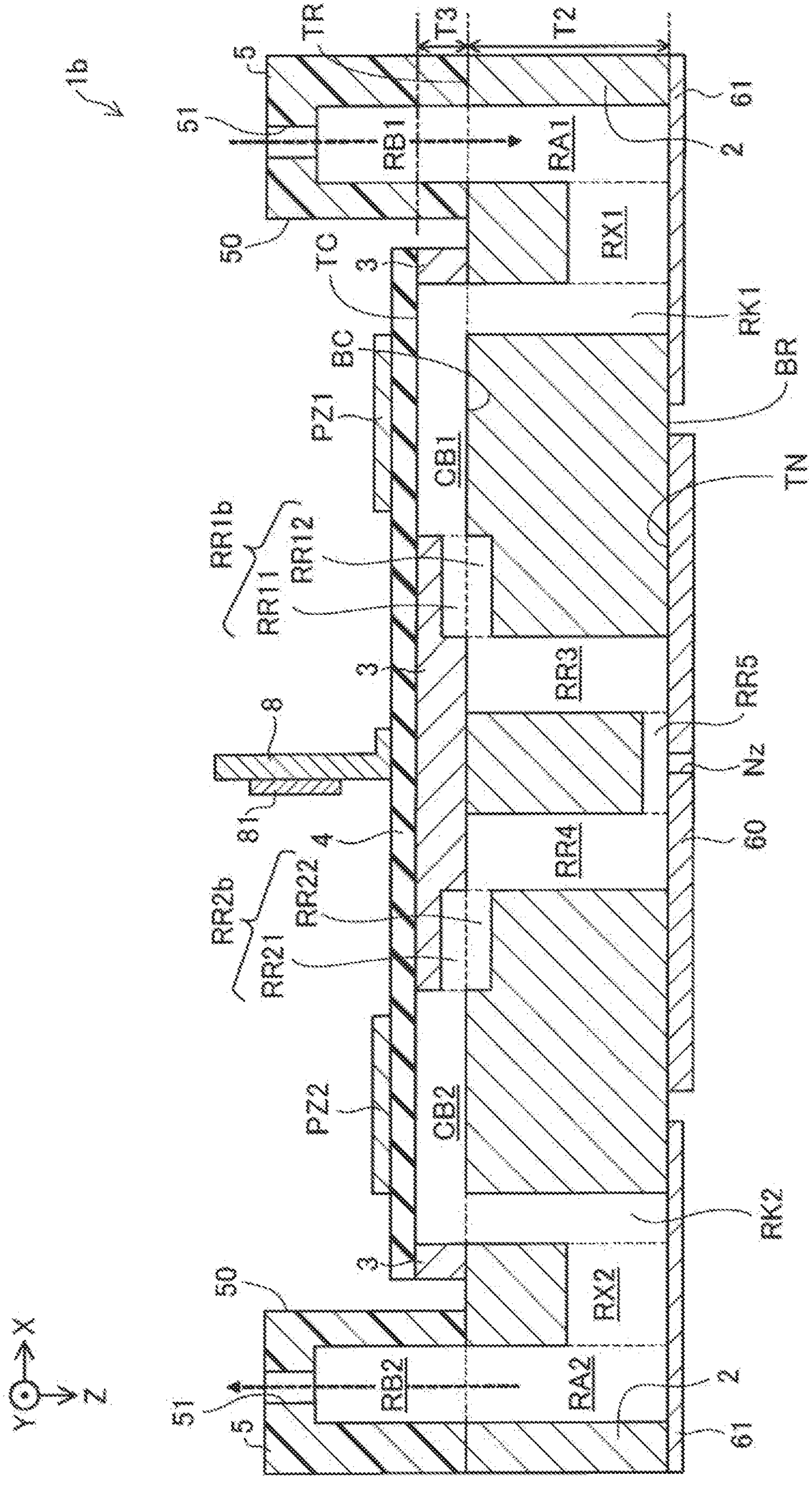
FIG. 8 is a cross-sectional view illustrating the internal structure of a liquid ejecting head according to a second embodiment.
Figure 9:
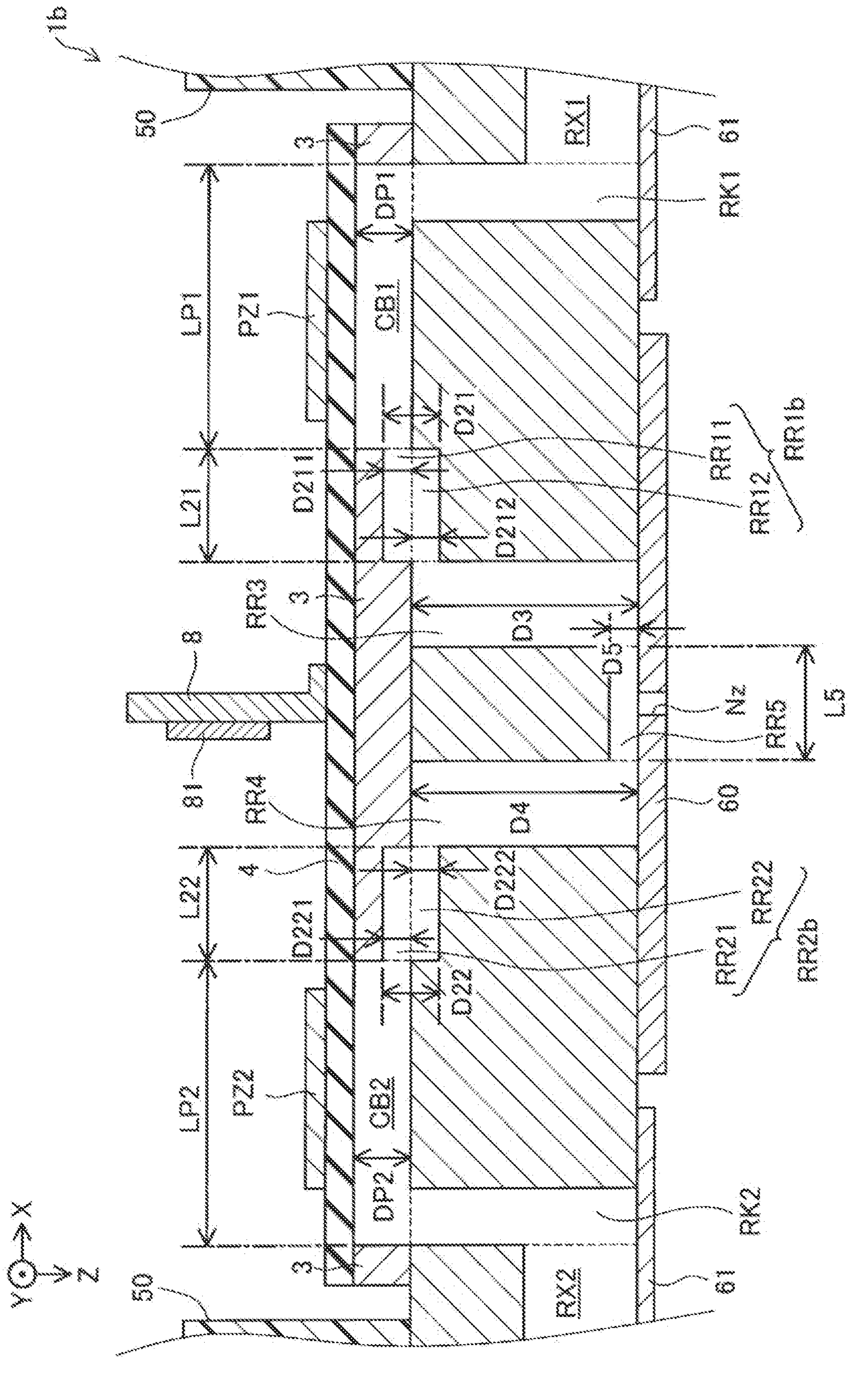
FIG. 9 is an enlarged cross-sectional view for explaining flow passages in the neighborhood of a nozzle in the liquid ejecting head according to the second embodiment.

With reference to FIGS. 8 and 9, the structure of a liquid ejecting head 1*b* according to a second embodiment will now be explained. FIG. 8 is a cross-sectional view illustrating the internal structure of the liquid ejecting head 1*b* according to the second embodiment. In FIGS. 8 and 9, in order to facilitate the readers' understanding of the disclosed technique, broken lines are used for schematically illustrating boundaries between flow passages. The liquid ejecting head 1*b* according to the second embodiment is different from the liquid ejecting head 1 according to the first embodiment in that it includes a first communication passage RR1*b* and a second communication passage RR2*b* in place of the first communication passage RR1 and the second communication passage RR2. Except for this difference, the structure of the second embodiment is the same as that of the first embodiment. The distance between the first piezoelectric element PZ1 and second piezoelectric element PZ2 of the liquid ejecting head 1*b* is the same as the distance between these piezoelectric elements of the liquid ejecting head 1. The distance between the first pressure compartment CB1 and the second pressure compartment CB2 of the liquid ejecting head 1*b* is the same as the distance between these pressure compartments of the liquid ejecting head 1.

In the foregoing example disclosed in the first embodiment, each of the first communication passage RR1 and the second communication passage RR2 is a flow passage defined by the bottom surface BC of the pressure compartment substrate 3 and a groove formed in the top surface TR of the communication plate 2 by etching the communication plate 2. By contrast, as illustrated in FIG. 8, in the present embodiment, the first communication passage RR1*b* is a flow passage defined by a first communication plate groove portion RR12, which is formed in the top surface TR of the communication plate 2, and a groove RR11, which is formed in the bottom surface BC of the pressure compartment substrate 3 by etching the pressure compartment substrate 3. Among grooves formed in the bottom surface BC of the pressure compartment substrate 3, the groove RR11 corresponding to the first communication passage RR1*b* will be referred to also as "first pressure compartment substrate groove portion RR11".

The second communication passage RR2*b* is a flow passage defined by a second communication plate groove portion RR22, which is formed in the top surface TR of the communication plate 2, and a groove RR21, which is formed in the bottom surface BC of the pressure compartment substrate 3 by etching the pressure compartment substrate 3. Among grooves formed in the bottom surface BC of the pressure compartment substrate 3, the groove RR21 corresponding to the second communication passage RR2*b* will be referred to also as "second pressure compartment substrate groove portion RR21".

FIG. 9 is an enlarged cross-sectional view for explaining flow passages in the neighborhood of the nozzle Nz in the liquid ejecting head 1*b* according to the second embodiment. In FIG. 9, the depth D21 of the first communication passage RR1*b* and the depth D22 of the second communication passage RR2*b* are illustrated. In the present embodiment, the depth D21 of the first communication passage RR1*b* is substantially the same as the depth DP1 of the first pressure compartment CB1. The depth D21 is the sum of the depth D211 of the first pressure compartment substrate groove portion RR11 and the depth D212 of the first communication plate groove portion RR12. In the present embodiment, the depth D211 of the groove RR11 and the depth D212 of the groove RR12 are set to be equal to each other, but not limited thereto; these depths may be set to be different from each other.

In the present embodiment, the depth D22 of the second communication passage RR2*b* is substantially the same as the depth DP2 of the second pressure compartment CB2. The depth D22 of the second communication passage RR2*b* is the sum of the depth D221 of the second pressure compartment substrate groove portion RR21 and the depth D222 of the second communication plate groove portion RR22. In the present embodiment, the depth D221 of the groove RR21 and the depth D222 of the groove RR22 are set to be equal to each other, but not limited thereto; these depths may be set to be different from each other.

In the present embodiment, the fifth communication passage RR5 is formed in the same step as the step of forming the first communication plate groove portion RR12 and the second communication plate groove portion RR22 by etching. By this means, it is possible to simplify manufacturing processes and reduce cost. In addition, in the present embodiment, the etching rate of the fifth communication passage RR5 is the same as the etching rate of the first communication plate groove portion RR12 and the second communication plate groove portion RR22. Therefore, the depth D5 of the fifth communication passage RR5 is equal to the depth D212 of the first communication plate groove portion RR12 and is equal to the depth D222 of the second communication plate groove portion RR22.

As illustrated in FIG. 9, the width L21 of the first communication passage RR1*b* according to the present embodiment is shorter than the width L1 of the first communication passage RR1 according to the first embodiment. This is because, in the first embodiment, the first communication passage RR1 is continuous on the +Z-directional side from the end of the first pressure compartment CB1, whereas, in the present embodiment, the first communication passage RR1*b* is continuous on the −X-directional side from the end of the first pressure compartment CB1. In the present embodiment, the width L21 of the first communication passage RR1*b* is substantially equal to the width L5 of the fifth communication passage RR5. The width of the first pressure compartment substrate groove portion RR11 and the width of the first communication plate groove portion RR12 are equal to each other, and are equal to the width L21 of the first communication passage RR1*b*. However, for example, the width of the first communication plate groove portion RR12 may be longer than the width L21. In this case, for example, the first communication plate groove portion RR12 may extend to a position on the +Z-directional side of the first pressure compartment CB1, and may be continuous on the +Z-directional side from the first pressure compartment CB1. Similarly, the width of the groove RR11 may be longer than the width L21. In this case, the groove RR11 may extend to a position on the −Z-directional side of the third communication passage RR3.

The width L22 of the second communication passage RR2*b* according to the present embodiment is shorter than the width L2 of the second communication passage RR2 according to the first embodiment. This is because, in the first embodiment, the second communication passage RR2 is continuous on the +Z-directional side to the end of the second pressure compartment CB2, whereas, in the present embodiment, the second communication passage RR2*b* is continuous on the +X-directional side to the end of the second pressure compartment CB2. In the present embodiment, the width L22 of the second communication passage RR2*b* is substantially equal to the width L5 of the fifth communication passage RR5. However, for example, the width of the second communication plate groove portion RR22 may be longer than the width L22. In this case, for example, the second communication plate groove portion RR22 may extend to a position on the +Z-directional side of the second pressure compartment CB2, and may be continuous on the +Z-directional side to the second pressure compartment CB2. Similarly, the width of the groove RR21 may be longer than the width L22. In this case, the groove RR21 may extend to a position on the −Z-directional side of the fourth communication passage RR4.

In the liquid ejecting head 1*b* according to the present embodiment, the first communication passage RR1*b* is a flow passage defined by the first communication plate groove portion RR12, which is formed in the top surface TR of the communication plate 2, and the groove RR11, which is formed in the bottom surface BC of the pressure compartment substrate 3. The second communication passage RR2*b* is a flow passage defined by the second communication plate groove portion RR22, which is formed in the top surface TR of the communication plate 2, and the groove RR21, which is formed in the bottom surface BC of the pressure compartment substrate 3. Forming a part of the first communication passage RR1*b* and the second communication passage RR2*b* in the pressure compartment substrate 3 makes it possible to prevent or reduce an increase in inertance of the first communication passage RR1*b* and the second communication passage RR2*b*.

In the liquid ejecting head 1*b* according to the present embodiment, the depth D5 of the fifth communication passage RR5 is equal to the depth D212 of the first communication plate groove portion RR12 and is equal to the depth D222 of the second communication plate groove portion RR22. Therefore, it is possible to make the etching rate of the fifth communication passage RR5 the same as the etching rate of the first communication passage RR1*b* and the second communication passage RR2*b*, thereby making it easier to form the fifth communication passage RR5, the first communication passage RR1*b*, and the second communication passage RR2*b* in the same step.

C. Other Embodiments

The scope of the present disclosure is not limited to the foregoing embodiments. The present disclosure may be modified in various ways within a range of not departing from its spirit. For example, technical features in the foregoing embodiments corresponding to technical features in aspects described in SUMMARY section of this specification may be replaced or combined in order to solve a part or a whole of problems described above or produce a part or a whole of effects described above. Some technical features may be deleted where unnecessary unless they are explained explicitly as indispensable in this specification.

(1) In a certain aspect of the present disclosure, a liquid ejecting head is provided. The liquid ejecting head of this aspect includes: a first pressure compartment extending in a first direction; a second pressure compartment extending in the first direction; a first communication passage continuous from the first pressure compartment and extending in the first direction; a second communication passage continuous to the second pressure compartment and extending in the first direction; a third communication passage continuous from the first communication passage and extending in a second direction intersecting with the first direction; a fourth communication passage continuous to the second communication passage and extending in the second direction; a fifth communication passage continuous from the third communication passage and continuous to the fourth communication passage and extending in the first direction; and a nozzle provided on the fifth communication passage. Since the liquid ejecting head of this aspect includes the first communication passage extending from the first pressure compartment in the first direction and the second communication passage extending from the second pressure compartment in the first direction, it is possible to shorten the length of the fifth communication passage in the first direction. Therefore, inside the fifth communication passage, it is easier for the second-directional motion energy of liquid supplied from the third communication passage and the second-directional motion energy of liquid supplied from the fourth communication passage to remain, and it is therefore easier to weaken the first-directional motion energy thereof. Consequently, there is a possibility that obstruction to or stagnation in liquid flow otherwise caused by liquid collision inside the fifth communication passage will be mitigated. Therefore, it is possible to prevent or reduce a decrease in performance of ejecting the liquid from the nozzle.

(2) In the liquid ejecting head according to the above aspect, the length of the fifth communication passage in the first direction may be less than the length of the first communication passage in the first direction and be less than the length of the second communication passage in the first direction. The liquid ejecting head having this structure makes it possible to further reduce the length of the fifth communication passage in the first direction and thus prevent or reduce a decrease in liquid ejection performance.

(3) In the liquid ejecting head according to the above aspect, the length of the fifth communication passage in the first direction may be less than a sum of the length of the first communication passage in the first direction and the length of the second communication passage in the first direction. The liquid ejecting head having this structure makes it possible to further reduce the length of the fifth communication passage in the first direction and thus prevent or reduce a decrease in liquid ejection performance.

(4) In the liquid ejecting head according to the above aspect, the length of the fifth communication passage in the first direction may be less than the length of the first pressure compartment in the first direction and be less than the length of the second pressure compartment in the first direction. The liquid ejecting head having this structure makes it possible to further reduce the length of the fifth communication passage in the first direction and thus prevent or reduce a decrease in liquid ejection performance.

(5) In the liquid ejecting head according to the above aspect, the length of the fifth communication passage in the first direction may be less than a sum of the length of the first pressure compartment in the first direction and the length of the second pressure compartment in the first direction. The liquid ejecting head having this structure makes it possible to further reduce the length of the fifth communication passage in the first direction and thus prevent or reduce a decrease in liquid ejection performance.

(6) In the liquid ejecting head having the above structure, the length of the first communication passage in the first direction may be less than the length of the first pressure compartment in the first direction, and the length of the second communication passage in the first direction may be less than the length of the second pressure compartment in the first direction. The liquid ejecting head having this structure makes it possible to prevent the flow path of the liquid from being excessively long and thus prevent or reduce a decrease in liquid ejection performance and prevent or suppress an increase in the size of the liquid ejecting head.

(7) In the liquid ejecting head according to the above aspect, the length of the fifth communication passage in the first direction may be less than a sum of the length of the first communication passage in the first direction, the length of the second communication passage in the first direction, the length of the first pressure compartment in the first direction and the length of the second pressure compartment in the first direction. The liquid ejecting head having this structure makes it possible to further reduce the length of the fifth communication passage in the first direction and thus prevent or reduce a decrease in liquid ejection performance.

(8) In the liquid ejecting head according to the above aspect, the length of the fifth communication passage in the second direction may be less than the length of the first communication passage in the second direction and be less than the length of the second communication passage in the second direction. The liquid ejecting head having this structure makes it possible to reduce flow-passage resistance inside the first communication passage and the second communication passage, and, in addition, makes it possible to enhance liquid ejection performance by making the flow velocity of the liquid inside the fifth communication passage, in which the liquid is susceptible to the influence of external air and therefore tends to increase in viscosity, higher.

(9) In the liquid ejecting head according to the above aspect, the length of the fifth communication passage in the second direction may be equal to the length of the first communication passage in the second direction and be equal to the length of the second communication passage in the second direction. The liquid ejecting head having this structure makes it possible to reduce manufacturing cost.

(10) In the liquid ejecting head according to the above aspect, the length of the fifth communication passage in the second direction may be less than the length of the first pressure compartment in the second direction and be less than the length of the second pressure compartment in the second direction. The liquid ejecting head having this structure makes it possible to reduce flow-passage resistance inside the first pressure compartment and the second pressure compartment, and, in addition, makes it possible to enhance liquid ejection performance by making the flow velocity of the liquid inside the fifth communication passage, in which the liquid is susceptible to the influence of external air and therefore tends to increase in viscosity, higher.

(11) The liquid ejecting head according to the above aspect may further include: a communication plate that includes the first communication passage, the second communication passage, the third communication passage, the fourth communication passage, and the fifth communication passage; a pressure compartment substrate that is stacked on one surface of the communication plate and includes the first pressure compartment and the second pressure compartment; and a nozzle substrate that is stacked on the other surface of the communication plate and includes the nozzle.

(12) In the liquid ejecting head having the above structure, the first communication passage may be defined by a first communication plate groove portion and one surface of the pressure compartment substrate, the first communication plate groove portion being formed in the one surface of the communication plate, the one surface of the pressure compartment substrate being a surface that faces the one surface of the communication plate; and the second communication passage may be defined by a second communication plate groove portion and the one surface of the pressure compartment substrate, the second communication plate groove portion being formed in the one surface of the communication plate, the one surface of the pressure compartment substrate being the surface that faces the one surface of the communication plate. The liquid ejecting head having this structure makes flow-passage connection between the first communication passage and the first pressure compartment and between the second communication passage and the second pressure compartment easier.

(13) In the liquid ejecting head having the above structure, the first communication passage may be defined by a first communication plate groove portion and a first pressure compartment substrate groove portion, the first communication plate groove portion being formed in the one surface of the communication plate, the first pressure compartment substrate groove portion being formed in one surface of the pressure compartment substrate, the one surface of the pressure compartment substrate being a surface that faces the one surface of the communication plate; and the second communication passage may be defined by a second communication plate groove portion and a second pressure compartment substrate groove portion, the second communication plate groove portion being formed in the one surface of the communication plate, the second pressure compartment substrate groove portion being formed in the one surface of the pressure compartment substrate, the one surface of the pressure compartment substrate being the surface that faces the one surface of the communication plate. Since a part of the first communication passage and the second communication passage is formed in the pressure compartment substrate, the liquid ejecting head having this structure makes it possible to prevent or reduce an increase in inertance of the first communication passage and the second communication passage.

(14) In the liquid ejecting head having the above structure, the length of the fifth communication passage in the second direction may be equal to the length of the first communication plate groove portion in the second direction and be equal to the length of the second communication plate groove portion in the second direction. The liquid ejecting head having this structure makes it easier to form the fifth communication passage, the first communication passage, and the second communication passage in the same step.

(15) In the liquid ejecting head having the above structure, the third communication passage, the fourth communication passage, and the fifth communication passage may be provided in the communication plate. As compared with a structure in which the third communication passage, the fourth communication passage, and the fifth communication passage are formed in a plurality of substrates, the manufacturing of the liquid ejecting head having this structure is easier.

(16) In the liquid ejecting head having the above structure, the third communication passage and the fourth communication passage may be through holes extending through the communication plate in the second direction, and the fifth communication passage may be defined by a third communication plate groove portion and one surface of the nozzle substrate, the third communication plate groove portion being formed in the other surface of the communication plate, the one surface of the nozzle substrate being a surface that faces the other surface of the communication plate. As compared with a structure in which the fifth communication passage is formed at the center of the communication plate in the thickness direction, the liquid ejecting head having this structure makes it easier to form the fifth communication passage.

(17) In the liquid ejecting head having the above structure, the thickness of the communication plate in the second direction may be greater than the thickness of the pressure compartment substrate in the second direction. The liquid ejecting head having this structure makes it easier to form a plurality of flow passages in the communication plate.

(18) The liquid ejecting head according to the above aspect may further include: a first piezoelectric element that changes pressure in the first pressure compartment; a second piezoelectric element that changes pressure in the second pressure compartment; and a wiring substrate that is provided between the first piezoelectric element and the second piezoelectric element and supplies power to the first piezoelectric element and the second piezoelectric element. The liquid ejecting head having this structure makes the transfer of heat from the wiring substrate to the liquid easier and therefore prevents or reduces problems arising from liquid viscosity and thus prevents or reduces a decrease in liquid ejection performance.

(19) The liquid ejecting head according to the above aspect may further include: a plurality of individual flow passages each including the first pressure compartment, the second pressure compartment, the first communication passage, the second communication passage, the third communication passage, the fourth communication passage, and the fifth communication passage; a common supply flow passage, which is a common passage in communication with the plurality of individual flow passages and through which liquid is supplied to each of the plurality of individual flow passages; and a common discharge flow passage, which is a common passage in communication with the plurality of individual flow passages and through which the liquid exits from each of the plurality of individual flow passages. This structure makes it possible to, in a liquid ejecting head having a structure for liquid circulation, prevent or reduce a decrease in performance of ejecting the liquid from the nozzle.

(20) In another aspect of the present disclosure, a liquid ejecting apparatus is provided. The liquid ejecting apparatus of this aspect includes: the liquid ejecting head described above; and a control device that controls operation of ejecting liquid from the liquid ejecting head described above.

The present disclosure can be embodied in various ways, without being limited to a liquid ejecting head and a liquid ejecting apparatus. For example, the present disclosure may be embodied as a flow-passage structure, a method for manufacturing a liquid ejecting head, or a method for manufacturing a liquid ejecting apparatus, but not limited thereto.

The scope of application of the present disclosure is not limited to an ink-jet scheme; the present disclosure may be applied to a liquid ejecting apparatus configured to eject any kind of liquid other than ink, and a liquid ejecting head used in the liquid ejecting apparatus. For example, the present disclosure may be applied to the following various kinds of liquid ejecting apparatus and its liquid ejecting head:

(1) Image recording apparatus such as a facsimile apparatus, etc.;

(2) Colorant ejecting apparatus used in color filter production for an image display device such as a liquid crystal display, etc.;

(3) Electrode material ejecting apparatus used for forming electrodes of an organic EL (Electro Luminescence) display, a surface-emitting display (Field Emission Display, FED), etc.;

(4) Liquid ejecting apparatus for ejecting liquid containing a living organic material used in biochip fabrication;

(5) Sample ejecting apparatus as a high precision pipette (6) Lubricating oil ejecting apparatus;

(7) Liquid resin ejecting apparatus;

(8) Liquid ejecting apparatus for ejecting, with pinpoint accuracy, lubricating oil onto a precision device such as a watch, a camera, etc.;

(9) Liquid ejecting apparatus for ejecting transparent liquid resin such as ultraviolet ray curing resin onto a substrate so as to form a micro hemispherical lens (optical lens) used in an optical communication element, etc.;

(10) Liquid ejecting apparatus for ejecting an acid etchant or an alkaline etchant for etching a substrate, etc.;

(11) Liquid ejecting apparatus equipped with a liquid ejecting head for ejecting any other micro droplets.

The term “liquid droplet” refers to a state of liquid ejected from a liquid ejecting apparatus and encompasses a particulate droplet, a tear-shaped droplet, and a droplet that forms a thready tail. The “liquid” may be any material that can be consumed by a liquid ejecting apparatus. For example, “liquid” may be any material that is in a liquid phase, including but not limited to: a material that is in a state of liquid having high viscosity or low viscosity, sol or gel water, other inorganic solvent or organic solvent, solution, liquid resin, and liquid metal (metal melt). The term “liquid” encompasses not only liquid as a state of substance but also liquid made as a result of dissolution, dispersion, or mixture of particles of a functional material made of a solid such as pigment or metal particles, etc. into/with a solvent. Besides a combination of the ink described in the foregoing embodiments and reaction liquid, typical examples of a combination of first liquid and second liquid are as follows:

(1) Principal agent and curative agent of an adhesive;

(2) Base paint and dilution agent, clear paint and dilution agent;

(3) Principal dissolvent containing cells of cell ink and dilution agent (4) Metallic leaf pigment dispersion liquid and dilution agent of ink for a metallic gloss finish (metallic ink);

(5) Gasoline, light oil, and bio-based fuel for vehicles;

(6) Principal ingredient and protective ingredient of a medicine;

(7) Fluorescent substance and sealant of a light-emitting diode (LED).

What is claimed is:

1. A liquid ejecting head, comprising:

a first pressure compartment extending in a first direction;

a second pressure compartment extending in the first direction;

a first communication passage continuous from the first pressure compartment and extending in the first direction;

a second communication passage continuous to the second pressure compartment and extending in the first direction;

a third communication passage continuous from the first communication passage and extending in a second direction intersecting with the first direction;

a fourth communication passage continuous to the second communication passage and extending in the second direction;

a fifth communication passage continuous from the third communication passage and continuous to the fourth communication passage and extending in the first direction; and a nozzle provided on the fifth communication passage.

2. The liquid ejecting head according to claim 1, wherein a length of the fifth communication passage in the first direction is less than a length of the first communication passage in the first direction and is less than a length of the second communication passage in the first direction.

3. The liquid ejecting head according to claim 1, wherein a length of the fifth communication passage in the first direction is less than a sum of a length of the first communication passage in the first direction and a length of the second communication passage in the first direction.

4. The liquid ejecting head according to claim 1, wherein a length of the fifth communication passage in the first direction is less than a length of the first pressure compartment in the first direction and is less than a length of the second pressure compartment in the first direction.

5. The liquid ejecting head according to claim 4, wherein a length of the first communication passage in the first direction is less than the length of the first pressure compartment in the first direction, and a length of the second communication passage in the first direction is less than the length of the second pressure compartment in the first direction.

6. The liquid ejecting head according to claim 1, wherein a length of the fifth communication passage in the first direction is less than a sum of a length of the first pressure compartment in the first direction and a length of the second pressure compartment in the first direction.

7. The liquid ejecting head according to claim 1, wherein a length of the fifth communication passage in the first direction is less than a sum of a length of the first communication passage in the first direction, a length of the second communication passage in the first direction, a length of the first pressure compartment in the first direction and a length of the second pressure compartment in the first direction.

8. The liquid ejecting head according to claim 1, wherein a length of the fifth communication passage in the second direction is less than a length of the first communication passage in the second direction and is less than a length of the second communication passage in the second direction.

9. The liquid ejecting head according to claim 1, wherein a length of the fifth communication passage in the second direction is equal to a length of the first communication passage in the second direction and is equal to a length of the second communication passage in the second direction.

10. The liquid ejecting head according to claim 1, wherein a length of the fifth communication passage in the second direction is less than a length of the first pressure compartment in the second direction and is less than a length of the second pressure compartment in the second direction.

11. The liquid ejecting head according to claim 1, further comprising:

a communication plate that includes the first communication passage, the second communication passage, the third communication passage, the fourth communication passage, and the fifth communication passage;

a pressure compartment substrate that is stacked on one surface of the communication plate and includes the first pressure compartment and the second pressure compartment; and a nozzle substrate that is stacked on an other surface of the communication plate and includes the nozzle.

12. The liquid ejecting head according to claim 11, wherein the first communication passage is defined by a first communication plate groove portion and one surface of the pressure compartment substrate, the first communication plate groove portion being formed in the one surface of the communication plate, the one surface of the pressure compartment substrate being a surface that faces the one surface of the communication plate; and the second communication passage is defined by a second communication plate groove portion and the one surface of the pressure compartment substrate, the second communication plate groove portion being formed in the one surface of the communication plate, the one surface of the pressure compartment substrate being the surface that faces the one surface of the communication plate.

13. The liquid ejecting head according to claim 11, wherein the first communication passage is defined by a first communication plate groove portion and a first pressure compartment substrate groove portion, the first communication plate groove portion being formed in the one surface of the communication plate, the first pressure compartment substrate groove portion being formed in one surface of the pressure compartment substrate, the one surface of the pressure compartment substrate being a surface that faces the one surface of the communication plate; and the second communication passage is defined by a second communication plate groove portion and a second pressure compartment substrate groove portion, the second communication plate groove portion being formed in the one surface of the communication plate, the second pressure compartment substrate groove portion being formed in the one surface of the pressure compartment substrate, the one surface of the pressure compartment substrate being the surface that faces the one surface of the communication plate.

14. The liquid ejecting head according to claim 13, wherein a length of the fifth communication passage in the second direction is equal to a length of the first communication plate groove portion in the second direction and is equal to a length of the second communication plate groove portion in the second direction.

15. The liquid ejecting head according to claim 11, wherein the third communication passage, the fourth communication passage, and the fifth communication passage are provided in the communication plate.

16. The liquid ejecting head according to claim 11, wherein the third communication passage and the fourth communication passage are through holes extending through the communication plate in the second direction, and the fifth communication passage is defined by a third communication plate groove portion and one surface of the nozzle substrate, the third communication plate groove portion being formed in the other surface of the communication plate, the one surface of the nozzle substrate being a surface that faces the other surface of the communication plate.

17. The liquid ejecting head according to claim 11, wherein a thickness of the communication plate in the second direction is greater than a thickness of the pressure compartment substrate in the second direction.

18. The liquid ejecting head according to claim 1, further comprising:

a first piezoelectric element that changes pressure in the first pressure compartment;

a second piezoelectric element that changes pressure in the second pressure compartment; and a wiring substrate that is provided between the first piezoelectric element and the second piezoelectric element and supplies power to the first piezoelectric element and the second piezoelectric element.

19. The liquid ejecting head according to claim 1, further comprising:

a plurality of individual flow passages each including the first pressure compartment, the second pressure compartment, the first communication passage, the second communication passage, the third communication passage, the fourth communication passage, and the fifth communication passage;

a common supply flow passage, which is a common passage in communication with the plurality of individual flow passages and through which liquid is supplied to each of the plurality of individual flow passages; and a common discharge flow passage, which is a common passage in communication with the plurality of individual flow passages and through which the liquid exits from each of the plurality of individual flow passages.

20. A liquid ejecting apparatus, comprising:

the liquid ejecting head according to claim 1; and a control device that controls operation of ejecting liquid from the liquid ejecting head according to claim 1.

* * * * *